United States Patent
Fan et al.

(10) Patent No.: US 11,413,574 B2
(45) Date of Patent: Aug. 16, 2022

(54) SYSTEMS, METHODS AND MATERIALS FOR HYDROGEN SULFIDE CONVERSION

(71) Applicant: OHIO STATE INNOVATION FOUNDATION, Columbus, OH (US)

(72) Inventors: Liang-Shih Fan, Columbus, OH (US); Sourabh G. Nadgouda, Columbus, OH (US); Kalyani V. Jangam, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 19 days.

(21) Appl. No.: 17/251,998

(22) PCT Filed: Aug. 7, 2019

(86) PCT No.: PCT/US2019/045438
§ 371 (c)(1),
(2) Date: Dec. 14, 2020

(87) PCT Pub. No.: WO2020/033500
PCT Pub. Date: Feb. 13, 2020

(65) Prior Publication Data
US 2021/0245095 A1    Aug. 12, 2021

Related U.S. Application Data

(60) Provisional application No. 62/734,387, filed on Sep. 21, 2018, provisional application No. 62/716,705, filed on Aug. 9, 2018.

(51) Int. Cl.
| | | |
|---|---|---|
| *B01D 53/52* | (2006.01) | |
| *B01D 53/82* | (2006.01) | |
| *B01J 38/40* | (2006.01) | |
| *C01B 3/04* | (2006.01) | |
| *C01B 17/04* | (2006.01) | |

(52) U.S. Cl.
CPC ............ *B01D 53/52* (2013.01); *B01D 53/82* (2013.01); *B01J 38/40* (2013.01); *C01B 3/04* (2013.01); *C01B 17/0408* (2013.01); *B01D 2255/20738* (2013.01); *B01D 2255/20784* (2013.01); *B01D 2256/16* (2013.01); *B01D 2257/304* (2013.01)

(58) Field of Classification Search
CPC .............. B01D 53/82; B01D 2256/16; B01D 53/8612; B01D 2255/9202; B01D 53/52; B01D 2255/20784; B01D 2255/20738; B01D 2256/245; B01D 2257/304; Y02E 60/36; C01B 3/04; C01B 17/04; C01B 3/06; C01B 17/0408; B01J 35/002; B01J 38/40; B01J 27/049
See application file for complete search history.

(56) References Cited

U.S. PATENT DOCUMENTS

| | | |
|---|---|---|
| 971,206 A | 9/1910 | Messerschmitt |
| 1,078,686 A | 11/1913 | Lane |
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 2,979,384 A | 4/1961 | Weiner et al. |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,382,033 A | 5/1968 | Kitagawa |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |

(Continued)

FOREIGN PATENT DOCUMENTS

| | | |
|---|---|---|
| CN | 1329761 A | 1/2001 |
| CN | 1325319 A | 12/2001 |

(Continued)

OTHER PUBLICATIONS

United States Patent Office Notice of Allowance for U.S. Appl. No. 16/634,844 dated Apr. 16, 2021 (5 pages).
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of CU-, Ni-, and Fe- Based Oxygen Carriers Using Syngas (CO+H2) for Chemical-Looping Combustion," Energy Fuels, 2007, 21 (4), pp. 1843-1853.
Abad et al., "The use of iron oxide as oxygen carrier in a chemical-looping reactor," Fuel, 2007, vol. 86, Issues 7-8, pp. 1021-1035.
Abdallah et al., "Comparison of mesoporous silicate supports for the immobilisation and activity of cytochrome c and lipase," J. Mol. Catal. B: Enzym., 2014, 108, 82-88.

(Continued)

*Primary Examiner* — Timothy C Vanoy
(74) *Attorney, Agent, or Firm* — Michael Best & Friedrich LLP

(57) ABSTRACT

Systems and methods use bimetallic alloy particles for converting hydrogen sulfide ($H_2S$) to hydrogen ($H_2$) and sulfur (S), typically during multiple operations. In a first operation, metal alloy composite particles can be converted to a composite metal sulfide. In a second operation, composite metal sulfide from the first operation can be regenerated back to the metal alloy composite particle using an inert gas stream. Pure, or substantially pure, sulfur can also be generated during the second operation.

27 Claims, 16 Drawing Sheets

(56) References Cited

U.S. PATENT DOCUMENTS

| | | |
|---|---|---|
| 3,726,966 A | 4/1973 | Johnston |
| 3,801,661 A | 4/1974 | Hart et al. |
| 3,879,514 A | 4/1975 | Dahl |
| 3,962,409 A | 6/1976 | Kotera et al. |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,151,124 A | 4/1979 | Gidaspow et al. |
| 4,155,832 A | 5/1979 | Cox et al. |
| 4,272,399 A | 6/1981 | Davis et al. |
| 4,318,711 A | 3/1982 | Smith |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,439,412 A | 3/1984 | Behie et al. |
| 4,521,117 A | 6/1985 | Ouwerkerk et al. |
| 4,594,140 A | 6/1986 | Cheng |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,902,586 A | 2/1990 | Wertheim |
| 4,895,821 A | 6/1990 | Kainer et al. |
| 4,957,523 A | 9/1990 | Zarate et al. |
| 5,130,106 A | 7/1992 | Koves et al. |
| 5,365,560 A | 11/1994 | Tam |
| 5,447,024 A | 9/1995 | Ishida et al. |
| 5,456,807 A | 10/1995 | Wachsman |
| 5,509,362 A | 4/1996 | Lyon |
| 5,518,187 A | 5/1996 | Bruno et al. |
| 5,529,599 A | 6/1996 | Calderon |
| 5,584,615 A | 12/1996 | Micklich |
| 5,630,368 A | 5/1997 | Wagoner |
| 5,730,763 A | 3/1998 | Manulescu et al. |
| 5,770,310 A | 6/1998 | Nogochi et al. |
| 5,827,496 A | 10/1998 | Lyon |
| 5,858,210 A | 1/1999 | Richardson |
| 5,891,415 A * | 4/1999 | Alkhazov .......... B01D 53/8612 423/230 |
| 5,965,098 A | 10/1999 | Boegner et al. |
| 6,007,699 A | 12/1999 | Cole |
| 6,030,589 A | 2/2000 | Hartweg et al. |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,506,351 B1 | 1/2003 | Jain et al. |
| 6,509,000 B1 | 1/2003 | Choudhary et al. |
| 6,517,631 B1 | 2/2003 | Bland |
| 6,607,704 B2 | 8/2003 | Guttridge et al. |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,067,456 B2 | 2/2006 | Fan et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,562,928 B2 | 10/2013 | Gupta |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 8,877,150 B1 | 11/2014 | Fan et al. |
| 9,017,627 B2 | 4/2015 | Gupta |
| 9,290,386 B2 | 3/2016 | Wasas |
| 9,376,318 B2 | 6/2016 | Fan et al. |
| 9,382,359 B2 | 7/2016 | Kanellopoulos et al. |
| 9,518,236 B2 | 12/2016 | Fan et al. |
| 9,573,118 B2 | 2/2017 | Colozzi et al. |
| 9,616,403 B2 | 4/2017 | Fan et al. |
| 9,777,920 B2 | 10/2017 | Fan et al. |
| 9,790,605 B2 | 10/2017 | Sheehan et al. |
| 9,903,584 B2 | 2/2018 | Fan et al. |
| 10,010,847 B2 | 7/2018 | Fan et al. |
| 10,081,772 B2 | 9/2018 | Fan et al. |
| 2001/0055559 A1 | 12/2001 | Sanfilippo et al. |
| 2002/0011428 A1 | 1/2002 | Scheuerman |
| 2002/0059864 A1 | 5/2002 | Janssen et al. |
| 2002/0179887 A1 | 12/2002 | Zeng et al. |
| 2003/0006026 A1 | 1/2003 | Matsumoto et al. |
| 2003/0024388 A1 | 2/2003 | Scharpf |
| 2003/0031291 A1 | 2/2003 | Yamamoto et al. |
| 2003/0102254 A1 * | 6/2003 | Eijsbouts .......... B01J 37/0236 208/143 |
| 2003/0119658 A1 | 6/2003 | Allison et al. |
| 2003/0124041 A1 | 7/2003 | Neumann et al. |
| 2003/0130360 A1 | 7/2003 | Kindig et al. |
| 2003/0153632 A1 | 8/2003 | Wang et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0092784 A1 | 5/2004 | Legendre |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech et al. |
| 2007/0010588 A1 | 1/2007 | Pearson |
| 2007/0049489 A1 | 3/2007 | Becue et al. |
| 2007/0117714 A1 | 5/2007 | Geyer et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1 | 12/2008 | Becker et al. |

(56) References Cited

U.S. PATENT DOCUMENTS

| | | |
|---|---|---|
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0119419 A1 | 5/2010 | Sprouse et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0138788 A1 | 6/2011 | Kanda et al. |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0159841 A1 | 6/2012 | Fan et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0071314 A1 | 3/2013 | Gupta |
| 2013/0085365 A1 | 4/2013 | Marashdeh et al. |
| 2013/0125462 A1 | 5/2013 | Greiner et al. |
| 2013/0149650 A1 | 6/2013 | Gauthier et al. |
| 2013/0255272 A1 | 10/2013 | Ajhar et al. |
| 2013/0261355 A1 | 10/2013 | Stamires |
| 2014/0021028 A1 | 1/2014 | Paganessi et al. |
| 2014/0034134 A1 | 2/2014 | Fan et al. |
| 2014/0072917 A1 | 3/2014 | Fan et al. |
| 2014/0134096 A1* | 5/2014 | Angelini .................. B01J 8/00 423/576.8 |
| 2014/0144082 A1 | 5/2014 | Fan et al. |
| 2014/0275297 A1 | 9/2014 | Velazquez-Vargas et al. |
| 2014/0295361 A1 | 10/2014 | Fan et al. |
| 2015/0093577 A1 | 4/2015 | Fan et al. |
| 2015/0238915 A1 | 8/2015 | Fan et al. |
| 2015/0291420 A1* | 10/2015 | Colozzi ................ B01J 27/0515 423/658.2 |
| 2015/0343416 A1 | 12/2015 | Fadhel et al. |
| 2016/0002034 A1 | 1/2016 | Fan et al. |
| 2016/0016137 A1 | 1/2016 | Fan et al. |
| 2016/0016800 A1 | 1/2016 | Noyes |
| 2016/0023190 A1 | 1/2016 | Fan et al. |
| 2016/0030904 A1 | 2/2016 | Fan et al. |
| 2016/0115026 A1* | 4/2016 | Angelini ............. B01D 53/8612 422/211 |
| 2016/0268616 A1 | 9/2016 | Fan et al. |
| 2016/0376512 A1 | 12/2016 | Fan et al. |
| 2017/0015554 A1 | 1/2017 | Siengchum et al. |
| 2017/0106355 A1* | 4/2017 | Colozzi ................ B01J 37/0215 |
| 2018/0296978 A1 | 10/2018 | Peck et al. |
| 2018/0353933 A1 | 12/2018 | Wendland et al. |
| 2019/0003704 A1 | 1/2019 | Aranda et al. |
| 2019/0152778 A1 | 5/2019 | Fan et al. |
| 2020/0156032 A1 | 5/2020 | Fan et al. |

FOREIGN PATENT DOCUMENTS

| | | |
|---|---|---|
| CN | 1454711 A | 11/2003 |
| CN | 1501534 A | 6/2004 |
| CN | 101389734 A | 3/2009 |
| CN | 101426885 A | 5/2009 |
| CN | 102187153 A | 9/2011 |
| CN | 102388005 A | 3/2012 |
| CN | 102612625 A | 7/2012 |
| CN | 102639213 A | 8/2012 |
| CN | 102686301 A | 9/2012 |
| CN | 103468322 A | 12/2013 |
| DE | 102010028816 A1 | 11/2011 |
| EP | 0161970 A1 | 11/1985 |
| EP | 1134187 A2 | 9/2001 |
| EP | 1445018 A1 | 8/2004 |
| EP | 1580162 A2 | 9/2005 |
| EP | 1845579 A2 | 10/2007 |
| EP | 1933087 A2 | 6/2008 |
| EP | 2279785 A2 | 2/2011 |
| EP | 2441816 A1 | 4/2012 |
| EP | 2450420 A1 | 5/2012 |
| EP | 2495030 A2 | 9/2012 |
| EP | 2515038 A1 | 10/2012 |
| EP | 2601443 | 6/2013 |
| EP | 1976633 B1 | 3/2014 |
| FR | 2924035 A1 | 5/2009 |
| JP | H03-68898 A | 3/1991 |
| JP | H10249153 A | 9/1998 |
| JP | 2006-502957 A | 1/2006 |
| KR | 20060096609 A | 9/2006 |
| KR | 101364823 B1 | 2/2014 |
| TW | 406055 B | 9/2000 |
| TW | 426728 B | 3/2001 |
| WO | WO1990/013773 A1 | 11/1990 |
| WO | WO1999/065097 A1 | 12/1999 |
| WO | WO2000/022690 A1 | 4/2000 |
| WO | WO2000/068339 A1 | 11/2000 |
| WO | WO2001/042132 A1 | 6/2001 |
| WO | WO2003/070629 A1 | 8/2003 |
| WO | WO2007/082089 A2 | 7/2007 |
| WO | WO2007/122498 A2 | 11/2007 |
| WO | WO2007/134075 A2 | 11/2007 |
| WO | WO2008/019079 A2 | 2/2008 |
| WO | WO2008/071215 A1 | 6/2008 |
| WO | WO2008/082312 A1 | 7/2008 |
| WO | WO2008/115076 A2 | 9/2008 |
| WO | WO2009/007200 A2 | 1/2009 |
| WO | WO2009/008565 A1 | 1/2009 |
| WO | WO2009/009388 A2 | 1/2009 |
| WO | WO2009/021258 A1 | 2/2009 |
| WO | WO2009/023515 A2 | 2/2009 |
| WO | WO2009/114309 A2 | 9/2009 |
| WO | WO2010/037011 A2 | 4/2010 |
| WO | WO2010/063923 A2 | 6/2010 |
| WO | WO2010/126617 A1 | 11/2010 |
| WO | WO2011/021161 A2 | 2/2011 |
| WO | WO2011/031752 A2 | 3/2011 |
| WO | WO2011/031755 A1 | 3/2011 |
| WO | WO2011/084734 A2 | 7/2011 |
| WO | WO2012/064712 A1 | 5/2012 |
| WO | WO2012/077978 A2 | 6/2012 |
| WO | 2012/144899 A1 | 10/2012 |
| WO | WO2012/155054 A1 | 11/2012 |
| WO | WO2012/155059 A1 | 11/2012 |
| WO | WO2013/040645 A1 | 3/2013 |
| WO | 2014/091024 A1 | 6/2014 |
| WO | WO2014/085243 A1 | 6/2014 |
| WO | WO2014/152814 A1 | 9/2014 |
| WO | WO2011/153568 A1 | 12/2014 |
| WO | WO2014/195904 A1 | 12/2014 |
| WO | WO2016/053941 A1 | 4/2016 |
| WO | WO2017/162427 A1 | 9/2017 |
| WO | 2020/210865 A1 | 10/2020 |

OTHER PUBLICATIONS

Adanez et al., "Progress in Chemical-Looping Combustion and Reforming technologies," Progress in Energy and Combustion Science, 2012, vol. 38, Issue 2, pp. 215-282.

Adanez et al., "Selection of oxygen carriers for chemical-looping combustion," Energy & Fuels, American Chemical Society, 2004, vol. 18, No. 2, pp. 371-377.

Ahern et al., "Comparison of fenofibratemesoporous silica drug-loading processes for enhanced drug delivery," Eur. J. Pharm. Sci., 2013, 50, 400-409.

(56) References Cited

OTHER PUBLICATIONS

Alalwan et al., "Co3O4 nanoparticles as oxygen carriers for chemical looping combustion: A materials characterization approach to understanding oxygen carrier performance," Chemical Engineering Journal, 2017, 319, 279-287.

Alalwan et al., "α-Fe2O3 Nanoparticles as Oxygen Carriers for Chemical Looping Combustion: An Integrated Materials Characterization Approach to Understanding Oxygen Carrier Performance, Reduction Mechanism, and Particle Size Effects," Energy Fuels, 2018, 32, 7959-7970.

Anisimov et al., "Density-functional calculation of effective Coulomb interactions in metals," Phys. Rev. B, 1991, 43, 7570.

Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.

Balasubramanian et al., "Hydrogen from methane in a single-step process," Chem Engr Science, 1999, 54(15-16), 3543.

Barreca et al., "Methanolysis of styrene oxide catalysed by a highly efficient zirconium-doped mesoporous silica," Appl. Catal. A, 2006, 304, 14-20.

Bell et al., "H2 Production via Ammonia Decomposition Using Non-Noble Metal Catalysts: A Review," Top Catal, 2016, 59, 1438-1457.

Burke et al., "Large pore bi-functionalised mesoporous silica for metal ion pollution treatment," J. Hazard. Mater., 2009, 164, 229-234.

Cao et al., "Investigation of Chemical Looping Combustion by Solid Fuels. 1. Process Analysis," Energy Fuels, 2006, 20(5), pp. 1836-1844.

Carrero et al., "A critical literature review of the kinetics for the oxidative dehydrogenation of propane over well-defined supported vanadium oxide catalysts," ACS Catalysis, 2014, 4: 3357-3380.

Cavani et al., "Oxidative dehydrogenation of ethane and propane: How far from commercial implementation?" Catalysis Today, 2007, 127(1): 113-131.

Cheng et al., "Carbon Dioxide Adsorption and Activation on Ceria (110): A density functional theory study," J. Chern. Phys. 2013, 138, 014702.

Cheng et al., "Methane Adsorption and Dissociation on Iron Oxide Oxygen Carrier: Role of Oxygen Vacancy," Phys. Chem. Chem. Phys. 2016, 18, 16423-16435.

Cheng et al., "Oxygen vacancy promoted methane partial oxidation over iron oxide oxygen carrier in chemical looping process," Phys. Chem. Chem. Phys., 2016, 18, 32418-32428.

Cheng et al., "Propagation of Olefin Metathesis to Propene on WO3 Catalysts: A Mechanistic and Kinetic Study," ACS Catal. 2015, 5, 59-72.

Cho et al., "Comparison of iron-, nickel-, copper- and manganese-based oxygen carriers for chemical-looping combustion," Fuel, 2004, vol. 83, Issue 9, pp. 1215-1225.

Chung et al., "Chemically and physically robust, commercially-viable iron-based composite oxygen carriers sustainable over 3000 redox cycles at high temperatures for chemical looping applications," Energy Environ. Sci., 2017, 10, 2318-2323.

Coleman et al., "Synthesis and characterization of dimensionally ordered semiconductor nanowires within mesoporous silica," J. Am. Chem. Soc., 2001, 123, 7010-7016.

Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2012, pp. 1274-1281.

De Diego et al., "Development of Cu-based oxygen carriers for chemical-looping combustion," Fuel, 2004, vol. 83, Issue 13, pp. 1749-1757.

De Klerk, "Gas-to-Liquid Conversion." Natural Gas Conversion Technologies Workshop of ARPA-E. U.S. Department of Energy, Houston, TX. vol. 13 (2012).

Delaney et al., "Development of chemically engineered porous metal oxides for phosphate removal," J. Hazard. Mater., 2011, 185, 382-391.

Delaney et al., "Porous silica spheres as indoor air pollutant scavengers," J. Environ. Monit., 2010, 12, 2244-2251.

Denton et al., "Simultaneous Production of High-Purity Hydrogen and Sequestration-Ready CO2 from Syngas," 2003.

EIA—Independent Statistics and Analysis. U.S. Department of Energy, U.S. Energy Information Administration "Annual Energy Outlook 2015 with Projections to 2040," Apr. 2015.

EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.

EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.

EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.

Environmental Protection Agency, "Geological CO2 Sequestration Technology and Cost Analysis," Technical Support Document, pp. i-vi & pp. 1-61, Jun. 2008.

Faezad Othman et al., "Utilization of Low-Grade Iron Ore in Ammonia Decomposition," Procedia Chemistry, 2016, 19:119-124.

Faezad Othman et al., "Utilization of Malaysian Low Grade Iron Ore as Medium for Ammonia Decomposition," ARPN Journal of Engineering and Applied Sciences, 2015, 10(22):17286-17288.

Fan et al., "Chemical looping processes for CO2 capture and carbonaceous fuel conversion prospect and opportunity," Energy Environmental Science, 2012, p. 7254-7280.

Fan et al., "Utilization of chemical looping strategy in coal gasification processes," Particuology, 2008, vol. 6, Issue 3, pp. 131-142.

Fan et al., "Chemical-Looping Technology Platform," AIChE Journal, 61(1), 2-22 (2015).

Fan, "Chemical Looping Systems for Fossil Energy Conversions," Wiley-AIChE: Hoboken, NJ, U.S.A.; 2010.

Flynn et al., "Pervaporation performance enhancement through the incorporation of mesoporous silica spheres into PVA membranes," Sep. Purif. Technol., 2013, 118, 73-80.

Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.

Forzatti, "Present status and perspectives in de-NOx SCR catalysis." Appl. Catal. A: Gen., 222(1-2), 2001, 221-236.

Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.

Garcia-Labiano et al., "Temperature variations in the oxygen carrier particles during their reduction and oxidation in a chemical-looping combustion system," Chemical Engineering Science, 2005, vol. 60, No. 3, pp. 851-862.

Geldart, "Types of Gas Fluidization," Power Technology, vol. 7, pp. 285-292, 1973.

Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.

Ghoneim et al., "Review on innovative catalytic reforming of natural gas to syngas," World J. Eng. Technol, 2016, 4(1):116-139.

Go et al., "Hydrogen production from two-step steam methane reforming in a fluidized bed reactor," International Journal of Hydrogen Energy, 2009, vol. 34, p. 1301-1309.

Goellner et al., "Baseline analysis of crude methanol production from coal and natural gas," National Energy Technology Laboratory (NETL), US Department of Energy, 2014, 83 pages.

(56) References Cited

OTHER PUBLICATIONS

Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, PA (2013).

Grimme et al., "A consistent and accurate ab initio parametrization of density functional dispersion correction (DFT-D) for the 94 elements H—Pu," J. Chem. Phys., 2010, 132, 19.

Grimme et al., "Effect of the damping function in dispersion corrected density functional theory," J. Comput. Chem., 2011, 32, 1456-1465.

Haque, "Microwave energy for mineral treatment processes—a brief review," International Journal of Mineral Processing, vol. 57, pp. 1-24, 1999.

Henkelman et al., "A climbing image nudged elastic band method for finding saddle points and minimum energy paths," J. Chem. Phys., 2000, 113, 9901-9904.

Herbst et al., "Relativistic calculations of 4f excitation energies in the rare-earth metals: Further results," Phys. Rev. B, 1978, 17, 3089.

Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.

Hildebrandt et al., "Producing Transportation Fuels with Less Work," Science, Mar. 27, 2009, vol. 323, pp. 1680-1681.

Hossain et al., "Chemical-looping combustion (CLC) for inherent CO2 separations—a review," Chemical Engineering Science, 2008, vol. 63, Issue 18, pp. 4433-4451.

Hua et al., "Three Dimensional Analysis of Electrical Capacitance Tomography Sensing Fields," 1999 IOP Publishing LTD, vol. 10, pp. 717-725.

Huijgen et al., "Carbon dioxide sequestration by mineral carbonation," ECN-C-03-016, www.ecn.nl/docs/library/report/200e/c03016.pdf, Feb. 2003.

Hung et al., "Zeolite ZSM-5 Supported Bimetallic Fe-Based Catalysts for Selective Catalytic Reduction of NO: Effects of Acidity and Metal Loading," Advanced Porous Materials, 2016, 4(3): 189-199(11).

Imanaka et al., "Advances in Direct NOx Decomposition Catalysts," Appl. Catal. A: Gen., 431-432, 2012, 1-8.

Ishida et al., "Evaluation of a Chemical-Looping-Combustion Power-Generation System by Graphic Exergy Analysis," Energy, 12(2), 147-154 (1987).

Iwamoto et al., "Influence of sulfur dioxide on catalytic removal of nitric oxide over copper ion-exchanged ZSM-5 Zeolite." Appl. Catal., 69(2), 1991, 15-19.

Izquierdo et al., "Catalyst Deactivation and Regeneration Processes in Biogas Tri-Reforming Process. The Effect of Hydrogen Sulfide Addition," Catalysts, 2018, 8(12): 19 pages.

Jin et al., "Development of a Novel Chemical-Looping Combustion: Synthesis of a Looping Material with a Double Metal Oxide of CoO—NiO," Energy & Fuels, 1998, vol. 12, 1272-1277.

Johansson et al., "Combustion of Syngas and Natural Gas in a 300 W Chemical-Looping Combustor," Chemical Engineering Research and Design vol. 2006, vol. 84, Issue 9, pp. 819-827.

Kaiser et al., "Precombustion and Postcombustion Decarbonization," IEEE, Power Engineering Review, Apr. 2001, pp. 15-17.

Kathe et al., "Modularization strategy for syngas generation in chemical," AIChE Journal, 2017, 63(8):3343-3360.

Kathe et al., "Chemical Looping Gasification for Hydrogen Enhanced Syngas Production with in-situ CO2 Capture," United States Department of Energy, OSTI: 1185194, (2015).

Kiuchi et al., "Recovery of hydrogen from hydrogen sulfide with metals or metal sulfides," Int. J. Hydrogen Energy, 1982, 7: 477-482.

Koulialias et al., "Ordered defects in Fe 1-x S generate additional magnetic anisotropy symmetries," Journal of Applied Physics, 2018, 123(3): 033902, 10 pages.

Kresse et al., "Ab initio molecular dynamics for liquid metals," Phys. Rev. B, 1993, 47, 558.

Kresse et al., "Efficiency of ab-initio total energy calculations for metals and semiconductors using a plane-wave basis set," Comput. Mater. Sci., 1996, 6, 15-50.

Kresse et al., "Efficient iterative schemes for ab initio total-energy calculations using a planewave basis set," Phys. Rev. B, 1996, 54, 11169.

Kumar et al., "Direct air capture of CO2 by physisorbent materials," Angew. Chem., Int. Ed., 2015, 54, 14372-14377.

Leion et al., "Solid fuels in chemical-looping combustion using oxide scale and unprocessed iron ore as oxygen carriers," Fuel, 2009, vol. 88, Issue 10, pp. 1945-1954.

Leion et al., "Solid fuels in chemical-looping combustion," International Journal of Greenhouse Gas Control, 2008, vol. 2, Issue 2, pp. 180-193.

Leion et al., "The use of petroleum coke as fuel in chemical-looping combustion," Fuel, 2007, vol. 86, Issue 12-13, pp. 1947-1958.

Li et al., "Clean coal conversion processes—progress and challenges," The Royal Society of Chemistry, Energy & Environmental Science, Jul. 30, 2008, vol. 1, pp. 248-267.

Li et al., "Ionic Diffusion in the Oxidation of Iron-effect of Support and Its Implications to Chemical Looping Applications," Energy Environ. Sci. 2011, 4, 876-880.

Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.

Li et al., "Syngas chemical looping gasification process: Bench-scale studies and reactor simulations," AICHE Journal, 2010, vol. 56, Issue 8, pp. 2186-2199.

Li et al., "Syngas Chemical Looping Gasification Process: Oxygen Carrier Particle Selection and Performance," Energy Fuels, 2009, 23(8), pp. 4182-4189.

Lin et al., "Novel Magnetically Separable Mesoporous Fe2O3@SBA-15 Nanocomposite with Fully Open Mesochannels for Protein Immobilization," Chemistry of Materials, 2008, vol. 20, pp. 6617-6622.

Liu et al., "Enhanced Performance of Alkali Metal Doped Fe2O3 and Fe2O3/Al2O3 Composites as Oxygen Carrier Material in Chemical Looping Combustion," Energy Fuels. 2013, 27, 4977-4983.

Liu et al., "Recent Advances in Catalytic DeNOx Science and Technology," Catalysis Reviews, 48(1), 2006, 43-89.

Lockwood Greene, "Ironmaking Process Alternative Screening Study, vol. I: Summary Report," Department of Energy United States of America, Oct. 2000, 153 pages.

Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).

Lyngfelt, "Chemical Looping Combustion of Solid Fuels—Status of Development," Applied Energy, 2014, vol. 113, p. 1869-1873.

Lyngfelt, "Oxygen Carriers for Chemical Looping Combustion Operational Experience," 1st International Conference on Chemical Looping, Mar. 2010.

Makepeace et. al., "Ammonia decomposition catalysis using non-stoichiometric lithium imide," Chem. Sci., 2015, 6, 3805.

Mamman et al., "Simultaneous steam and CO2 reforming of methane to syngas over NiO/MgO/SA-5205 in presence and absence of oxygen," Applied Catalysis A, 1998, vol. 168, p. 33-46.

Mao et al., "Facile synthesis of phase-pure FeCr2Se4 and FeCr2S4 nanocrystals via a wet chemistry method," J. Mater. Chem. C, 2014, 2: 3744-3749.

Marashdeh, Q. et al., "A Multimodal Tomography System Based on ECT Sensors," IEEE Sensors Journal, vol. 7, No. 3, 2007, 426-433.

Marashdeh, Q., Advances in Electrical Capacitance Tomography, Dissertation, The Ohio State University, 2006.

Masui et al.."Direct Decomposition of NO into N2 and O2 OverC-type Cubic Y2O3—Tb4O7—ZrO2," Materials Sciences and Applications, 3(10), 2012, 733-738.

Mattisson et al., "Application of chemical-looping combustion with capture of CO2," Second Nordic Minisymposium on Carbon Dioxide Capture and Storage, Goeteborg, Oct. 26, 2001, pp. 46-51.

(56) References Cited

OTHER PUBLICATIONS

Mattisson et al., "Chemical-looping combustion using syngas as fuel," International Journal of Greenhouse Gas control, 2007, vol. 1, Issue 2, pp. 158-169.
Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.
Mattison et al., "Reactivity of Some Metal Oxides Supported on Alumina with Alternating Methane and Oxygen—Application for Chemical-Looping Combustion," Energy & Fuels, 2003, vol. 17, pp. 643-651.
Mattisson et al., "The use of iron oxide as an oxygen carrier in chemical-looping combustion of methane with inherent separation of CO2," Fuel, 2001, vol. 80, pp. 1953-1962.
Mattisson et al., "Use of Ores and Industrial Products As Oxygen Carriers in Chemical-Looping Combustion," Energy & Fuels, 2009, vol. 23, pp. 2307-2315.
Mihai et al., "Chemical looping methane partial oxidation: The effect of the crystal size and O content of LaFeO3," Journal of Catalysis, 2012, 293:175-185.
Miller et al., "Toward Transformational Carbon Capture," AIChE Journal, 62, 1-10 (2016).
Moreira, "Steam Cracking: Kinetics and Feed Characterization," Dissertation, 2015, 10 pages.
NETL, National Energy Technology Laboratory. U.S. Department of Energy, "Quality Guidelines for Energy System Studies—Specification for Selected Feedstocks." Jan. 2012.
NETL, National Energy Technology Laboratory. U.S. Department of Energy, "Syngas Contaminant Removal and Conditioning," webpage accessed on Jul. 8, 2018.
Nipattummakul et al., "Hydrogen and syngas production from sewage sludge via steam gasification," Fuel and Energy Abstracts, 2010, 35 (21), 11738-11745.
Ockwig et al., "Membranes for Hydrogen Separation," American Chemical Society, Chem. Rev., Oct. 10, 2007, vol. 107, pp. 4078-4110.
O'Connor et al., "Carbon Dioxide Sequestration by Direct Mineral Carbonation: Results from Recent Studies and Currents Status," Abstract, USDOE Office of Fossil Energy, 2001.
Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).
Ortiz et al., "Hydrogen Production by Auto-Thermal Chemical-Looping Reforming in A Pressurized Fluidized Bed Reactor Using Ni-based Oxygen Carriers," International Journal of Hydrogen Energy, 2010, vol. 35, p. 151-160.
OSHA, "Hydrogen Sulfide in Workplaces," <https://www.osha.gov/SLTC/hydrogensulfide/hydrogensulfide_found.html> webpage accessed Jul. 8, 2018.
Park et al., "CO2 Mineral Sequestration: Chemically Enhanced Aqueous Carbonation of Serpentine," The Canadian Journal of Chemical Engineering, 2003, vol. 81, pp. 885-890.
Park et al., "CQ2 Mineral Sequestration: physically activated dissolution of serpentine and pH swing process," Chemical Engineering Science, 2004, vol. 59, pp. 5241-5247.
Perdew et al., "Generalized gradient approximation made simple," Phys. Rev. Lett., 1996, 77, 3865.
Pfeifer, "Industrial furnaces—status and research challenges," Energy Procedia, 2017, 120: 28-40.
Pröll et al., "Syngas and a separate nitrogen/argon stream via chemical looping reforming—A 140 kW pilot plant study," Fuel, 2010, vol. 89, Issue 6, pp. 1249-1256.
Qin et al., "Enhanced methane monversion in mhemical looping partial oxidation systems using a copper doping modification," Appl. Catal. B, 2018, 235, 143-149.
Qin et al., "Evolution of Nanoscale Morphology in Single and Binary Metal Oxide Microparticles During Reduction and Oxidation Processes," J. Mater. Chem. A. 2014, 2, 17511-17520.
Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.
Qin et al., "Nanostructure Formation Mechanism and Ion Diffusion in Iron-Titanium Composite Materials with Chemical Looping Redox Reactions," J. Mater. Chem. A. 2015, 3, 11302-11312.
Quin et al., "Improved Cyclic redox reactivity of lanthanum modified iron-based oxygen carriers in carbon monoxide xhemical looping combustion," Journal of Materials Chemistry A, 2017, 8 pages.
Rollmann et al., "First-principles calculation of the structure and magnetic phases of hematite," Phys. Rev. B, 2004, 69, 165107.
Rostrup-Nielsen, "Syngas in Perspective," Catalysis Today, 2002, 71(3-4), 243-247.
Ruchenstein et al., "Carbon dioxide reforming of methane over nickel/alkaline earth metal oxide catalysts," Applied Catalysis A, 1995, vol. 133, p. 149-161.
Russo et al., "Impact of Process Design of on the Multiplicity Behavior of a Jacketed Exothermic CSTR," AICHE Journal, Jan. 1995, vol. 41, No. 1, pp. 135-147.
Ryden et al., "Synthesis gas generation by chemical-looping reforming in a continuously operating laboratory reactor," Fuel, 2006, vol. 85, p. 1631-1641.
Sassi et al., "Sulfur Recovery from Acid Gas Using the Claus Process and High Temperature Air Combustion (HiTAC) Technology," Am. J. Environ. Sci., 2008, 4, 502-511.
Sattler et al., "Catalytic Dehydrogenation of Light Alkanes on Metals and Metal Oxides," Chem Rev, 2014, 114(20): 10613-10653.
Scott et al., "In situ gasification of a solid fuel and CO2 separation using chemical looping," AICHE Journal, 2006, vol. 52, Issue 9, pp. 3325-3328.
Shen et al., "Chemical-Looping Combustion of Biomass in a 10k Wth Reactor with Iron Oxide as an Oxygen Carrier," Energy & Fuels, 2009, vol. 23, pp. 2498-2505.
Shen et al., "Experiments on chemical looping combustion of coal with a NiO based oxygen carrier," Combustion and Flame, 2009, vol. 156, Issue 3, pp. 721-728.
Sheppard et al., "Paths to which the nudged elastic band converges," J. Comput. Chem., 2011, 32, 1769-1771.
Shick et al., "Single crystal growth of $CoCr_2S_4$ and $FeCr_2S_4$," Journal of Crystal Growth, 1969, 5(4): 313-314.
Speight, "Gasification processes for syngas and hydrogen production," Gasification for Synthetic Fuel Production, Woodhead Publishing, 2015, 119-146.
Sridhar et al., "Syngas Chemical Looping Process: Design and Construction of a 25 kWth Subpilot Unit," Energy Fuels, 2012, 26(4), pp. 2292-2302.
Steinfeld et al., "Design Aspects of Solar Thermochemical Engineering—A case Study: Two-Step Water-Splitting Cycle Using the Fe3O4/FeO Redox System," Solar Energy, 1999, pp. 43-53.
Steinfeld, "Solar hydrogen production via a two-step water-splitting thermochemical cycle based on Zn/ZnO redox reactions," International Journal of Hydrogen Energy, 2002, vol. 27, pp. 611-619.
Sun et al., "Review: Fundamentals and challenges of electrochemical CO2 reduction using two-dimensional materials," Chem, 2017, 3, 560-587.
Takanabe, "Catalytic Conversion of Methane: Carbon Dioxide Reforming and Oxidative Coupling," Journal of the Japan Petroleum Institute, 2012, 55, 1-12.
Thiollier et al., "Preparation and Catalytic Properties of Chromium-Containing Mixed Sulfides," Journal of Catalysis, 2011, 197(1): 58-67.
Tian et al., "Thermodynamic investigation into carbon deposition and sulfur evolution in a Ca-based chemical-looping combustion system," Chemical Engineering Research & Design, 2011, vol. 89, Issue 9, p. 1524.

(56) References Cited

OTHER PUBLICATIONS

Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.
U.S. Department of Energy, NCCTI Energy Technologies Group, Office of Fossil Energy, "CO2 Capture and Storage in Geologic Formations," p. 34, Revised Jan. 8, 2002.
United States Environmental Protection Agency. "Air Pollution Control Technology Fact Sheet: Selective Catalytic Reforming," <https://www3.epa.gov/ttncatc1/cica/files/fscr.pdf> (2003).
Usachev et al., "Conversion of Hydrocarbons to Synthesis Gas: Problems and Prospects," Petroleum Chemistry, 2011, vol. 51, p. 96-106.
Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.
Vernon et al., "Partial Oxidation of Methane to Synthesis Gas," Catalysis Letters, 1990, vol. 6, p. 181-186.
Wang et al., "Highly efficient metal sulfide catalysts for selective dehydrogenation of isobutane to isobutene," ACS Catalysis, 2014, 4: 1139-1143.
Wang et al., "Isobutane Dehydrogenation over Metal (Fe, Co, and Ni) Oxide and Sulfide Catalysts: Reactivity and Reaction Mechanism," ChemCatChem, Jul. 2014, vol. 6, pp. 2305-2314.
Wang et al., "Study of bimetallic interactions and promoter effects of FeZn, FeMn and FeCr Fischer-Tropsch synthesis catalysts," Journal of Molecular Catalysis A: Chemical, 2010, 326:29-40.
Warsito, W. et al., Electrical Capacitance Volume Tomography, 2007, pp. 1-9.
Watanabe, "Electrical properties of $FeCr_2S_4$ and $CoCr_2S_4$," Solid State Communications, 1973, 12(5): 355-358.
Xu et al., "A novel chemical looping partial oxidation process for thermochemical conversion of biomass to syngas," Applied Energy, 2018, 222:119-131.
Yamazaki et al., "Development of highly stable nickel catalyst for methane-steam reaction under low steam to carbon ratio," Applied Catalyst A, 1996, vol. 136, p. 49-56.
Yin et. al., "A mini-review on ammonia decomposition catalysts for on-site generation of hydrogen for fuel cell applications," Applied Catalysis A: General, 2004, 277, 1-9.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
Zeng et al., "Metal oxide redox chemistry for chemical looping processe," Nat Rev Chem., 2018,2,349-364.
International Preliminary Report on Patentability for International Application PCT/US/2007/000956 dated Jul. 24, 2008.
International Preliminary Report on Patentability for International Application PCT/US/2010/048121 dated Mar. 22, 2012.
International Preliminary Report on Patentability for International Application PCT/US/2010/048125 dated Mar. 22, 2012.
International Preliminary Report on Patentability for International Application PCT/US/2011/059736 dated May 23, 2013.
International Preliminary Report on Patentability for International Application PCT/US/2012/037544 dated Nov. 12, 2013.
International Preliminary Report on Patentability for International Application PCT/US/2012/037557 dated Nov. 21, 2013.
International Search Report and Written Opinion for Application No. PCT/US14/14877 dated May 14, 2014 (10 pages).
International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2007/000956 dated Dec. 4, 2007.
International Search Report and Written Opinion for Application No. PCT/US2009/058579 dated Aug. 3, 2010.
International Search Report and Written Opinion for Application No. PCT/US2010/048121 dated Apr. 1, 2011.
International Search Report and Written Opinion for Application No. PCT/US2010/048125 dated Dec. 17, 2010.
International Search Report and Written Opinion for Application No. PCT/US2011/059736 dated Mar. 27, 2012.
International Search Report and Written Opinion for Application No. PCT/US2012/037544 dated Aug. 10, 2012.
International Search Report and Written Opinion for Application No. PCT/US2012/037557 dated Aug. 13, 2012.
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
International Search Report and Written Opinion for Application No. PCT/US2017/027241 dated Jul. 10, 2017 (11 pages).
International Search Report and Written Opinion for Application No. PCT/US2017/034503 dated Aug. 15, 2017 (14 pages).
International Search Report and Written Opinion for Application No. PCT/US2018/044530 dated Oct. 17, 2018 (13 pages).
International Search Report and Written Opinion for Application No. PCT/US2019/045438 dated Oct. 31, 2019 (9 pages).
International Search Report and Written Opinion for Application No. PCT/US2020/013823 dated Apr. 9, 2020 (16 pages).
International Search Report and Written Opinion for Application No. PCT/US2020/027324 dated Jul. 9, 2020 (10 pages).
International Search Report and Written Opinion for Application No. PCT/US2020/046918 dated Nov. 24, 2020 (12 pages).
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 13/394,572 dated Oct. 13, 2015 (21 pages).
United States Patent Office Notice of Allowance for U.S. Appl. No. 13/394,572 dated Dec. 14, 2015 (10 pages).
United States Patent Office Notice of Allowance for U.S. Appl. No. 13/394,572 dated Feb. 22, 2016 (8 pages).
United States Patent Office Final Rejection for U.S. Appl. No. 15/162,199 dated Oct. 21, 2016 (9 pages).
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 13/394,396 dated Jan. 15, 2016 (13 pages).
United States Patent Office Notice of Allowance for U.S. Appl. No. 13/394,396 dated Aug. 3, 2016 (8 pages).
United States Patent Office Action for U.S. Appl. No. 15/376,590 dated Mar. 9, 2018 (10 pages).
United States Patent Office Action for U.S. Appl. No. 15/376,590 dated Oct. 19, 2018 (8 pages).
United States Patent Office Notice of Allowance for U.S. Appl. No. 15/376,590 dated Jan. 9, 2019 (6 pages).
Final Rejection pertaining to U.S. Appl. No. 13/121,009 dated Mar. 14, 2013.
Advisory Action pertaining to U.S. Appl. No. 13/121,009 dated Jun. 24, 2013.
Office Action pertaining to U.S. Appl. No. 13/121,009 dated Sep. 13, 2013.
Final Rejection pertaining to U.S. Appl. No. 13/121,009 dated Jan. 16, 2014.
Office Action pertaining to U.S. Appl. No. 13/121,009 dated Sep. 6, 2012.
United States Patent Office Notice of Allowance for U.S. Appl. No. 14/504,295 dated Sep. 28, 2015 (10 pages).
United States Patent Office Action for U.S. Appl. No. 15/191,249 dated Dec. 28, 2017 (14 pages).

(56) References Cited

OTHER PUBLICATIONS

United States Patent Office Notice of Allowance for U.S. Appl. No. 15/191,249 dated May 22, 2018 (8 pages).
United States Patent Office Action for U.S. Appl. No. 13/883,795 dated Jun. 20, 2016 (15 pages).
United States Patent Office Action for U.S. Appl. No. 13/883,795 dated Jun. 23, 2017 (11 pages).
United States Patent Office Notice of Allowance for U.S. Appl. No. 13/883,795 dated Jan. 22, 2018 (7 pages).
United States Patent Office Action for U.S. Appl. No. 14/116,627 dated Oct. 20, 2016 (6 Pages).
United States Patent Office Notice of Allowance for U.S. Appl. No. 14/116,627 dated Mar. 10, 2017 (5 pages).
United States Patent Office Notice of Allowance for U.S. Appl. No. 14/116,627 dated Jun. 14, 2017 (5 pages).
United States Patent Office Action for U.S. Appl. No. 15/685,951 dated May 14, 2019 (10 pages).
United States Patent Office Notice of Allowance for U.S. Appl. No. 15/685,951 dated Aug. 12, 2019 (5 pages).
United States Patent Office Final Rejection for U.S. Appl. No. 14/116,636 dated Oct. 24, 2016 (10 pages).
United States Patent Office Notice of Allowance for U.S. Appl. No. 14/116,636 dated Nov. 7, 2017 (5 pages).
United States Patent Office Action for U.S. Appl. No. 14/766,086 dated Jan. 13, 2017 (22 pages).
United States Patent Office Action for U.S. Appl. No. 14/766,086 dated Sep. 7, 2017 (19 pages).
United States Patent Office Action for U.S. Appl. No. 14/766,086 dated Jan. 2, 2018 (21 pages).
United States Patent Office Notice of Allowance for U.S. Appl. No. 14/766,086 dated Aug. 8, 2018 (9 pages).
United States Patent Office Action for U.S. Appl. No. 16/166,746 dated May 1, 2019 (9 pages).
United States Patent Office Notice of Allowance for U.S. Appl. No. 16/166,746 dated Aug. 15, 2019 (8 pages).
United States Patent Office Action for U.S. Appl. No. 14/775,044 dated May 30, 2017 (15 pages).
United States Patent Office Action for U.S. Appl. No. 14/775,044 dated Feb. 26, 2018 (16 pages).
United States Patent Office Action for U.S. Appl. No. 14/774,727 dated Sep. 14, 2017 (10 pages).
United States Patent Office Notice of Allowance for U.S. Appl. No. 14/774,730 dated Nov. 16, 2016 (10 pages).
Office Action pertaining to U.S. Appl. No. 12/160,803 dated Jun. 7, 2011.
Final Rejection pertaining to U.S. Appl. No. 12/160,803 dated Jan. 5, 2012.
Office Action pertaining to U.S. Appl. No. 12/160,803 dated Jun. 5, 2012.
Final Rejection pertaining to U.S. Appl. No. 12/160,803 dated Mar. 22, 2013.
Advisory Action pertaining to U.S. Appl. No. 12/160,803 dated Jul. 11, 2013.
Examiner's Answer before the Patent Trial and Appeal Board for U.S. Appl. No. 12/160,803 dated Nov. 4, 2013.
United States Patent Office Action for U.S. Appl. No. 12/160,803 dated Feb. 23, 2016 (27 pages).
United States Patent Office Action for U.S. Appl. No. 14/091,654 dated Jun. 12, 2015 (16 pages).
United States Patent Office Action for U.S. Appl. No. 14/091,654 dated Oct. 30, 2014 (14 pages).
United States Patent Office Action for U.S. Appl. No. 14/091,654 dated Jan. 4, 2016 (17 pages).
United States Patent Office Action for U.S. Appl. No. 14/634,319 dated Nov. 7, 2016 (7 pages).
United States Patent Office Action for U.S. Appl. No. 14/634,319 dated Apr. 11, 2017 (9 pages).
United States Patent Office Action for U.S. Appl. No. 15/647,084 dated Dec. 26, 2017 (7 pages).
United States Patent Office Notice of Allowance for U.S. Appl. No. 15/647,084 dated Mar. 19, 2018 (8 pages).
United States Patent Office Notice of Allowance for U.S. Appl. No. 16/260,447 dated Oct. 21, 2019 (10 pages).
United States Patent Office Action for U.S. Appl. No. 16/091,508 dated Feb. 12, 2020 (18 pages).
United States Patent Office Action for U.S. Appl. No. 16/216,911 dated Apr. 16, 2020 (6 pages).
United States Patent Office Action for U.S. Appl. No. 16/634,844 dated May 12, 2020 (8 pages).
United States Patent Office Action for U.S. Appl. No. 16/091,253 dated Jul. 8, 2020 (13 pages).
United States Patent Office Action for U.S. Appl. No. 16/634,844 dated Aug. 31, 2020 (4 pages).
United States Patent Office Notice of Allowance for U.S. Appl. No. 16/216,911 dated Sep. 17, 2020 (8 pages).
United States Patent Office Notice of Allowance for U.S. Appl. No. 16/091,253 dated Jan. 27, 2021 (8 pages).
Pans et al., "Optimization of H2 production with CO2 capture by steam reforming of methane integrated with a chemical-looping combustion system," International Journal of Hydrogen Energy, 2013, 38(27): 11878-11892.
Ryden et al., "Using steam reforming to produce hydrogen with carbon dioxide capture by chemical-looping combustion," International Journal of Hydrogen Energy, 2006, 31(10): 1271-1283.
International Search Report and Written Opinion for Application No. PCT/US2020/049105 dated Jan. 29, 2021 (22 pages).
International Search Report and Written Opinion for Application No. PCT/US2020/050107 dated Feb. 4, 2021 (15 pages).
Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.
United States Patent Office Action for U.S. Appl. No. 15/162,199 dated Jun. 30, 2016 (10 pages).
"Amine-Bearing Mesoporous Silica for CO2 and H2S Removal from Natural Gas and Biogas," Youssef Belmabkhout, Guy De Weireld, and Abdelhamid Sayari, Langmuir, 2009, 25 (23), 13275-13278. DOI: 10.1021/la903238y.
United States Patent Office Notice of Allowance for U.S. Appl. No. 17/602,889 dated Mar. 17, 2022 (8 pages).

\* cited by examiner

SYSTEMS, METHODS AND MATERIALS FOR HYDROGEN SULFIDE CONVERSION

CROSS-REFERENCE TO RELATED APPLICATIONS

The present application is a U.S. national stage entry of International Patent Application No. PCT/US2019/045438, filed on Aug. 7, 2019, which claims priority to U.S. Provisional Patent Application No. 62/716,705, filed on Aug. 9, 2018, and U.S. Provisional Patent Application No. 62/734,387, filed on Sep. 21, 2018, the entire contents of each of which are fully incorporated herein by reference.

TECHNICAL FIELD

The present disclosure relates to systems and methods for converting hydrogen sulfide ($H_2S$) in a gas stream to hydrogen ($H_2$) and sulfur. More particularly, the present disclosure relates to bimetallic alloys usable in systems and methods for generating hydrogen ($H_2$) and sulfur streams from hydrogen sulfide ($H_2S$) streams.

BACKGROUND

Natural gas, petroleum and coal are primarily utilized as energy sources. However, sulfur compounds such as hydrogen sulfide ($H_2S$) within these fuels limit their use due to the toxic and corrosive nature of such compounds. For example, exposure to $H_2S$ can be harmful for humans even at concentrations as low as 10 ppm. In addition, the applicability of these fuels as a feedstock for value-added chemicals is also limited due to catalyst deactivation as a result of sulfur poisoning.

Currently used processes for removing hydrogen sulfide ($H_2S$) are intensive and demand high energy. Additionally, currently used processes cannot recover $H_2$ along with sulfur because $H_2$ is lost in the form of water vapor. Furthermore, the performance of solids used in hydrogen sulfide ($H_2S$) processing can deteriorate after a single cycle. Such systems are inefficient and can require replenishing the solids after one or just a few cycles of sulfur capture and regeneration. Therefore, there is a need for an improved process to effectively convert hydrogen sulfide ($H_2S$) into hydrogen ($H_2$) and sulfur.

SUMMARY

Disclosed herein are systems and methods for converting hydrogen sulfide ($H_2S$) in a gas stream to hydrogen ($H_2$) and sulfur. In one aspect, a method utilizes metal alloy composite particles for converting hydrogen sulfide ($H_2S$) in a gas stream to hydrogen ($H_2$) and sulfur. The method is a two-step thermochemical decomposition of $H_2S$ into $H_2$ and sulfur. The first step is referred to as the sulfidation operation, wherein $H_2S$ reacts with the metal alloy composite particle to form a mixture of metal sulfides and produce $H_2$. The second step is referred to as the regeneration operation, wherein the mixture of metal sulfides is subjected to a high temperature and gas input stream to remove the captured sulfur and regenerate the metal alloy composite particle. Thereby, separate $H_2$ and sulfur streams are produced from an input stream including $H_2S$. Compared to the conventionally used Claus process for sulfur recovery, which only produces sulfur and no $H_2$, the disclosed method is economically favorable. It is also beneficial to the environment as it converts a toxic, poisonous, and corrosive $H_2S$ gas to valuable chemicals $H_2$ and sulfur.

There is no specific requirement that a material, technique or method relating to $H_2S$ conversion include all of the details characterized herein, in order to obtain some benefit according to the present disclosure. Thus, the specific examples characterized herein are meant to be exemplary applications of the techniques described, and alternatives are possible. Other aspects of the disclosure will become apparent by consideration of the detailed description and accompanying drawings.

DETAILED DESCRIPTION

I. Definitions

Figure 1:
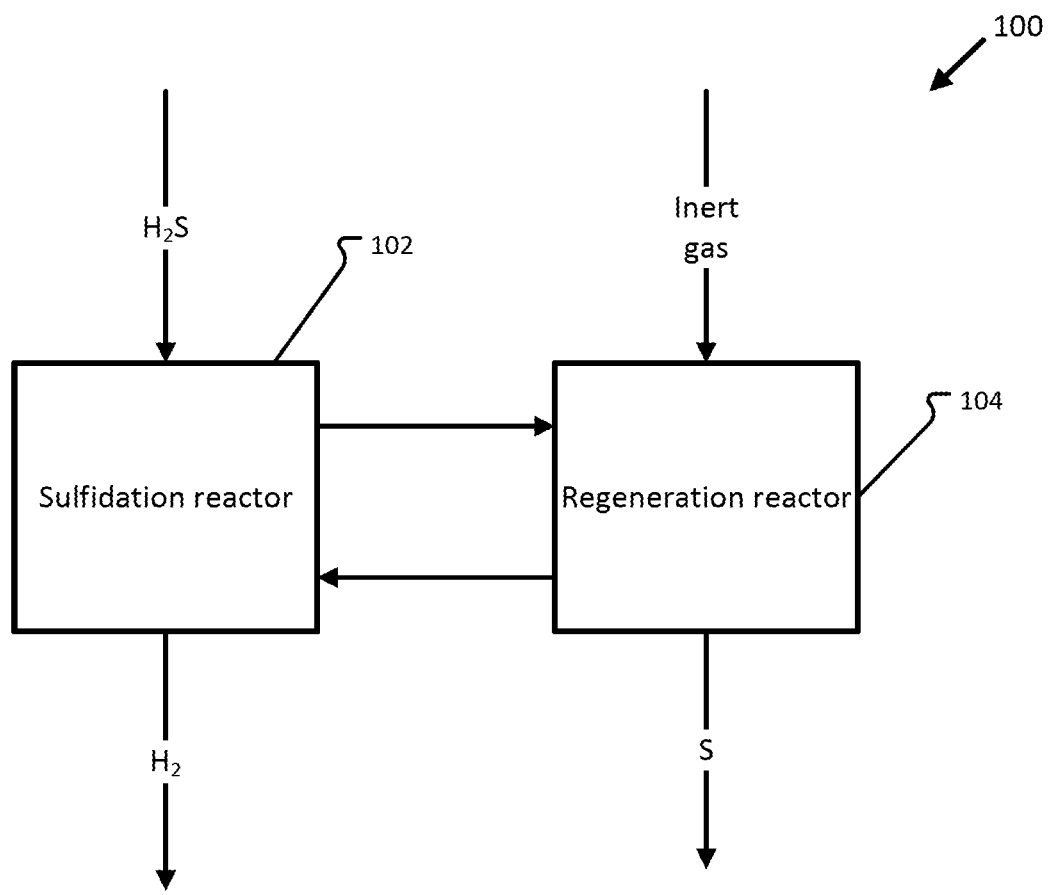
FIG. 1 shows a schematic diagram of an exemplary system for $H_2S$ conversion to $H_2$ and S.

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. For example, when a pressure range is described as being between ambient pressure and another pressure, a pressure that is ambient pressure is expressly contemplated.

II. Metal Alloy Composite Particles

Disclosed herein are metal alloy composite particles for use in systems and methods for converting $H_2S$ into hydrogen ($H_2$) and sulfur (S). Typical metal alloy composite particles disclosed and contemplated herein include metal alloy material, secondary material, and support material. Without being bound by a particular theory, it is believed that each component plays a role in $H_2S$ processing. For instance, the metal alloy material captures sulfur generated from dissociation of $H_2S$. Additionally, efficient capture of sulfur appears to be linked to the formation of spinel phase, which thermodynamically favors near, or complete, sulfur capture. The secondary material forms active centers on the surface of the metal alloy composite particle where it catalytically dissociates $H_2S$ to $H_2$ and sulfur. The metal alloy material is dispersed in the support material to prevent sintering and agglomeration of the metal alloy composite particle, which could reduce the regenerability of the particle.

A. Metal Alloy Material

Metal alloy material comprises a first metal component and a second metal component. The first metal component comprises a first metal, a first metal sulfide comprising the first metal, a first metal oxide comprising the first metal, or combinations thereof. The second metal component comprises a second metal, a second metal sulfide comprising the second metal, a second metal oxide comprising the second metal, or combinations thereof.

Usually, each of the first metal and second metal is selected from: iron (Fe), chromium (Cr), nickel (Ni), Zinc (Zn), cobalt (Co), manganese (Mn) and copper (Cu). For example, the first metal component may comprise iron and the second metal component may comprise chromium. In some embodiments, the first metal component comprises iron sulfide and the second metal component comprises chromium sulfide.

The metals of the metal alloy material may be dispersed uniformly as this results in high conversion of $H_2S$ to $H_2$ and also improves the regenerability of the metal alloy composite particle. Non-uniform dispersion and/or a layered structure may result in diffusion limitations of $H_2S$ in the metal alloy composite particle product layer and lower the reaction kinetics.

B. Secondary Material

The metal alloy composite particle may further comprise one or more secondary material components. In some instances, secondary material is a dopant, as that term is typically understood in the art. In some instances, secondary material has similar properties to a dopant and/or imparts similar characteristics as a dopant, but exists as a different phase. In various implementations, the secondary material is dispersed uniformly along the surface of the particle and is surrounded by the alloy material.

Typically, secondary material is in the form of $MS_x$, where M is a metal, S is sulfur, and x is in the range of values between 0 and 2. For example, x maybe 0, 1, or 2. X may also be a non-integer value. For example, x may be 0.5 or 1.5. Example metals M include, but are not limited to, molybdenum, nickel, cobalt, manganese, tungsten, vanadium and combinations thereof.

The secondary material may be a sulfide. For example, the secondary material may be a molybdenum disulfide, a nickel sulfide, a cobalt sulfide, a manganese sulfide, a tungsten sulfide, vanadium sulfide or combinations thereof.

In some instances, secondary material is a metal oxide. For example, the secondary material may be a molybdenum oxide, a nickel oxide, a cobalt oxide, a manganese oxide, a tungsten oxide, a vanadium oxide or combinations thereof.

C. Support Material

The metal alloy composite particle may further comprise one or more support materials. The support material can be any inert material. The one or more support materials can be metals, metal oxides, non-metal oxides, zeolites or metal organic frameworks. Suitable support materials include, but are not limited to, alumina, bauxite, titania, silicon, zirconium, and alumina silicate. For example, the support material may be an aluminum oxide, a silicon oxide, a titanium oxide, a zirconium oxide, and the like.

D. Example Amounts and Sizes

The metal alloy composite particle may comprise any suitable ratio of components to produce the desired effect. For example, the metal alloy composite particle may comprise 10-95% by weight of the first metal component, 5-80% by weight of the second metal component, and 0-50% by weight of the secondary material. For example, the metal alloy composite particle may comprise 10-95% by weight iron, 5-80% by weight chromium, and 0-50% by weight of the secondary material.

For example, the metal alloy composite particle may comprise about 10%, about 15%, about 20%, about 25%, about 30%, about 40%, about 45%, about 50%, about 55%, about 60%, about 65%, about 70%, about 75%, about 80%, about 85%, about 90%, or about 95% by weight of the first metal component. In various implementations, the metal alloy composite particle comprises 10 wt % to 50 wt %; 40 wt % to 95 wt %; 20 wt % to 75 wt %; 30 wt % to 50 wt %; 35 wt % to 65 wt %; 50 wt % to 80 wt %; or 40 wt % to 70 wt % of the first metal component.

The metal alloy composite particle may comprise about 5%, about 10%, about 15%, about 20%, about 25%, about 30%, about 35%, about 40%, about 45%, about 50%, about 55%, about 60%, about 65%, about 70%, about 75%, or about 80% by weight of the second metal component. In various implementations, the metal alloy composite particle comprises 5 wt % to 50 wt %; 45 wt % to 80 wt %; 15 wt % to 65 wt %; 10 wt % to 35 wt %; 35 wt % to 60 wt %; 60 wt % to 80 wt %; or 20 wt % to 45 wt % of the second metal component.

The metal alloy composite particle may comprise about 0%, about 5%, about 10%, about 15%, about 20%, about 25%, about 30%, about 40%, about 45%, or about 50% by weight of the secondary material. In various implementations, the metal alloy composite particle comprises 5 wt % to 45 wt %; 10 wt % to 50 wt %; 20 wt % to 40 wt %; 30 wt % to 50 wt %; 10 wt % to 20 wt %; 15 wt % to 35 wt %; or 20 wt % to 30 wt % of the secondary material.

The metal alloy composite particle has a diameter of between about 100 µm and about 10 mm. For example, the metal alloy composite particle may have a diameter of about 100 µm to about 10 mm, about 1 mm to about 9 mm, about 2 mm to about 8 mm, about 3 mm to about 7 mm, or about 4 mm to about 6 mm.

The grain size of the first metal component, the second metal component, and the secondary material can vary depending on the type of material used and the temperature at which the metal alloy composite particle is sintered. A smaller grain size is preferred as it results in faster reaction kinetics due to elimination of diffusion limitations in the metal alloy composite particle.

The range of grain size for the first metal component, the second metal component, and the secondary material can be between $10^{-3}$ µm to 50 µm. For example, the grain size can be about $10^{-3}$ µm, about $10^{-2}$ µm, about 1 µm, about 5 µm, about 10 µm, about 15 µm, about 20 µm, about 25 µm, about 30 µm, about 35 µm, about 40 µm, about 45 µm, or about 50 µm.

Another parameter that affects the reaction kinetics is the porosity of the metal alloy composite particle which determines the gas diffusion within the metal alloy composite particle. Porosity of the metal alloy composite particle is proportional to the concentration of support material and it can be in the range of $10^{-3}$ to 5 cm$^3$/g. The surface area of the metal alloy composite particle is dependent on the grain size as well as the porosity and is in the range of 0.1 to 100 m$^2$/g.

III. Systems and Methods for Converting $H_2S$ into Hydrogen ($H_2$) and Sulfur

Disclosed herein are systems and methods for converting $H_2S$ into hydrogen ($H_2$) and sulfur. The system for converting $H_2S$ into hydrogen ($H_2$) and sulfur may comprise multiple reactors. For example, the system may comprise a sulfidation reactor and a regeneration reactor. The conditions in each of the sulfidation reactor and the regeneration reactor are modified as described below to ensure that the appropriate sulfidation and regeneration reactions occur in each reactor. In other embodiments, the system may comprise one reactor. The conditions in the single reactor may be modified such that the sulfidation and regeneration operations can occur in the single reactor.

Broadly speaking, the disclosed systems and methods reduce the amount of $H_2S$ in the input gas stream. For example, the disclosed method can be used to reduce the amount of $H_2S$ in the gas stream to below 100 ppm. For example, the disclosed method can be used to reduce the amount of $H_2S$ in the gas stream to less than about 100 ppm, less than about 90 ppm, less than about 80 ppm, less than about 70 ppm, less than about 50 ppm, less than about 40 ppm, less than about 30 ppm, less than about 20 ppm, less than about 10 ppm, less than about 5 ppm, less than about 1 ppm, less than about 1 ppm, or less than about 0.1 ppm. For example, the disclosed method can be used to reduce the amount of $H_2S$ in the gas stream to less than 0.1 ppm.

A. Sulfidation Operation

The disclosed method comprises a sulfidation operation. The sulfidation operation can be performed in a sulfidation reactor. The sulfidation reactor can be a fixed bed reactor, a fluidized bed reactor, a co-current moving bed reactor, or a counter-current moving bed reactor. A moving bed reactor configuration also includes a packed moving bed, staged fluidized bed, a downer and/or a rotary kiln.

The sulfidation operation comprises contacting a first gaseous stream comprising $H_2S$ with a metal alloy composite particle. The first gaseous stream may further comprise additional gases. For example, the $H_2S$-containing gas stream can also include CO, $H_2$, and/or hydrocarbons. Example hydrocarbons include but are not limited to methane, ethane, propane, butane and higher alkanes. The first gaseous stream may contain $H_2S$ and additional gases in other proportions or quantities. Usually, the first gaseous stream includes trace amounts or no oxygen ($O_2$).

The sulfidation operation may be performed at any suitable temperature to facilitate sulfidation of the metal alloy composite particle. For example, the sulfidation operation may be performed at about 100° C. to about 950° C. For example, the sulfidation operation may be performed at about 100° C., about 150° C., about 200° C., about 250° C., about 300° C., about 350° C., about 400° C., about 450° C., about 500° C., about 550° C., about 600° C., about 650° C., about 700° C., about 750° C., about 800° C., about 850° C., about 900° C., or about 950° C. In some instances, the sulfidation operation is performed at about 300° C. to about 450° C. As another example, the sulfidation operation is performed at about 350° C. to about 400° C.

The equilibrium of sulfidation reaction favors operating at lower temperatures, but the reaction kinetics is faster at higher temperatures. As such, some embodiments perform the sulfidation operation at a temperature of 300° C. to 450° C. Performing sulfidation at 300° C. to 450° C. can eliminate the need for cooling and reheating the $H_2S$ containing gas stream as is done for conventional $H_2S$ removal processes such as Selexol, Rectisol, or amine based processes.

The sulfidation operation may be performed at any suitable pressure. For example, the pressure at which sulfidation operation occurs can be about 1 atm to about 150 atm. For example, the pressure can be about 1 atm, about 2 atm, about 3 atm, about 4 atm, about 5 atm, about 6 atm, about 7 atm, about 8 atm, about 9 atm, about 10 atm, about 15 atm, about 20 atm, about 25 atm, about 30 atm, about 35 atm, about 40 atm, about 45 atm, about 50 atm, about 55 atm, about 60 atm, about 65 atm, about 70 atm, about 75 atm, about 80 atm, about 85 atm, about 90 atm, about 95 atm, about 100 atm, about 105 atm, about 110 atm, about 115 atm, about 120 atm, about 125 atm, about 130 atm, about 135 atm, about 140 atm, about 145 atm, or about 150 atm. In various instances, the pressure at which the sulfidation operation occurs is from 1 atm to 30 atm; 1 atm to 5 atm; 1 atm to 60 atm; 5 atm to 20 atm; 2 atm to 10 atm; or 1 atm to 15 atm. Generally, the kinetics of the sulfidation reaction appear to be faster at higher pressures and there is not an effect of pressure on the equilibrium of sulfidation reaction.

The kinetic rate of sulfidation reaction determines the gas residence time in the sulfidation reactor for maximum conversion of $H_2S$. The gas residence time can vary from 0.2 seconds to 45 minutes. It is preferred to have the gas residence time between 0.5 s to 15 min. For example, the gas residence time can be around 0.5 seconds, about 1 second, about 30 seconds, about 1 minute, about 2.5 minutes, about 5 minutes, about 7.5 minutes, about 10 minutes, about 12.5 minutes, or about 15 minutes.

The amount of $H_2S$ gas that can be treated by the disclosed process is dependent on the composition of the metal alloy composite particle. The ratio of gas to metal alloy composite particle that can be used in the disclosed systems and methods can be about 1:5 to about 10:1. Preferably, the ratio of gas to metal alloy composite particle ranges from about 1:2 to about 5:1. For example, the ratio of gas to metal alloy composite particle can be about 1:2, about 1:1, about 2:1, about 3:1, about 4:1, or about 5:1.

In the sulfidation operation, the hydrogen sulfide ($H_2S$) in the first gaseous input stream reacts in a sulfidation reaction with the metal alloy composite particle to generate hydrogen gas ($H_2$) and one or more sulfide minerals. The hydrogen gas ($H_2$) may be collected and stored for future use in other processes. The sulfide mineral is selected from the group consisting of a metal sulfide, a thiospinel and combinations thereof. Without being bound by a particular theory, it appears that the presence of thiospinel is responsible for favorable equilibrium towards $H_2S$ decomposition and is non-reactive towards other gases that may be present in the $H_2S$ containing gas stream. For example, the sulfide mineral may be an iron sulfide, a chromium sulfide, or combinations thereof. In some embodiments, sulfide mineral comprises $FeCr_2S_4$.

B. Regeneration Operation

The disclosed method further comprises a regeneration operation. Typically, the regeneration operation occurs at higher temperatures than those used during the sulfidation operation. The regeneration operation can be performed in a regeneration reactor. The regeneration reactor can be a fixed bed reactor, a fluidized bed reactor, a co-current moving bed reactor, or a counter-current moving bed reactor. A moving bed reactor configuration also includes a packed moving bed, staged fluidized bed, a downer and/or a rotary kiln.

The regeneration operation comprises contacting a second gaseous input stream comprising at least one inert gas with the one or more sulfide minerals generated during the sulfidation operation. The regeneration operation thereby generates sulfur gas and regenerates the metal alloy composite particle for subsequent use. The sulfur gas obtained from the regeneration operation can be collected for future use in downstream applications. For example, the sulfur gas can be condensed and removed as solid or liquid sulfur based on its downstream application.

The at least one inert gas can include nitrogen, carbon dioxide and combinations thereof. For example, the at least one inert gas can be nitrogen. For example, regeneration operation can comprise contacting $FeCr_2S_4$ produced during the sulfidation operation with nitrogen gas, thereby regenerating iron sulfide and chromium sulfide and producing sulfur gas.

The regeneration operation may be performed at any suitable regeneration temperature to facilitate regeneration of the metal alloy composite particle. The regeneration temperature is dependent on the sulfur pressure in the regeneration reactor. A lower sulfur pressure in the regeneration reactor favors the equilibrium towards removal of sulfur and hence lower regeneration temperatures can be used. The regeneration temperatures can vary from 500° C. to 1100° C. For example, the regeneration operation may be performed at about 750° C., about 800° C., about 850° C., about 900° C., about 950° C., about 1000° C., about 1050° C., or about 1100° C. In various implementations, the regeneration temperature may be from 600° C. to 1000° C.; from 700° C. to 1100° C.; from 800° C. to 1000° C.; or from 700° C. to 900° C.

The regeneration operation may be performed under vacuum. Alternatively, the regeneration operation may be performed under pressure conditions. The pressure conditions in the regeneration reactor can range from 1 atm to 150 atm. For example, the pressure can be about 1 atm, about 2 atm, about 3 atm, about 4 atm, about 5 atm, about 6 atm, about 7 atm, about 8 atm, about 9 atm, about 10 atm, about 15 atm, about 20 atm, about 25 atm, about 30 atm, about 35 atm, about 40 atm, about 45 atm, about 50 atm, about 55 atm, about 60 atm, about 65 atm, about 70 atm, about 75 atm, about 80 atm, about 85 atm, about 90 atm, about 95 atm, about 100 atm, about 105 atm, about 110 atm, about 115 atm, about 120 atm, about 125 atm, about 130 atm, about 135 atm, about 140 atm, about 145 atm, or about 150 atm.

In some instances, a high gas:solids ratio is employed for the regeneration operation as it keeps the sulfur pressure low in the regeneration reactor, thus enabling a relatively lower regeneration temperature. For example, the gas:solids molar ratio can range from 0.2 to 10, preferably, from 0.5 to 5. For example, gas:solids molar ratio can be about 1:2, about 1:1, about 2:1, about 3:1, about 4:1, or about 5:1.

A low gas residence time is preferred to aid in maintaining low sulfur pressures in the regeneration reactor. The gas residence time can vary from 0.05 seconds to about 5 minutes, preferably from about 0.1 s to about 2 minutes. For example, the gas residence time can be about 0.05 seconds, about 0.1 seconds, about 1 second, about 5 seconds, about 10 seconds, about 30 seconds, about 60 seconds, about 90 seconds, about 2 minutes, about 3 minutes, about 4 minutes, or about 5 minutes.

The disclosed method can be operated in batch operational mode, a semi-batch operational mode, or continuous operation mode. The method can further comprise contacting the metal alloy composite particle produced following the regeneration operation, (i.e. the regenerated metal alloy composite particle) with a subsequent first gaseous input stream, thus repeating the process of isolating hydrogen gas ($H_2$) and sulfur from an $H_2S$ containing feed stream. The hydrogen gas ($H_2$) production performance of the regenerated metal alloy composite particle can be similar to the performance of the original metal alloy composite particle.

C. Example Configurations of Systems and Method for $H_2S$ Conversion

Figure 2:
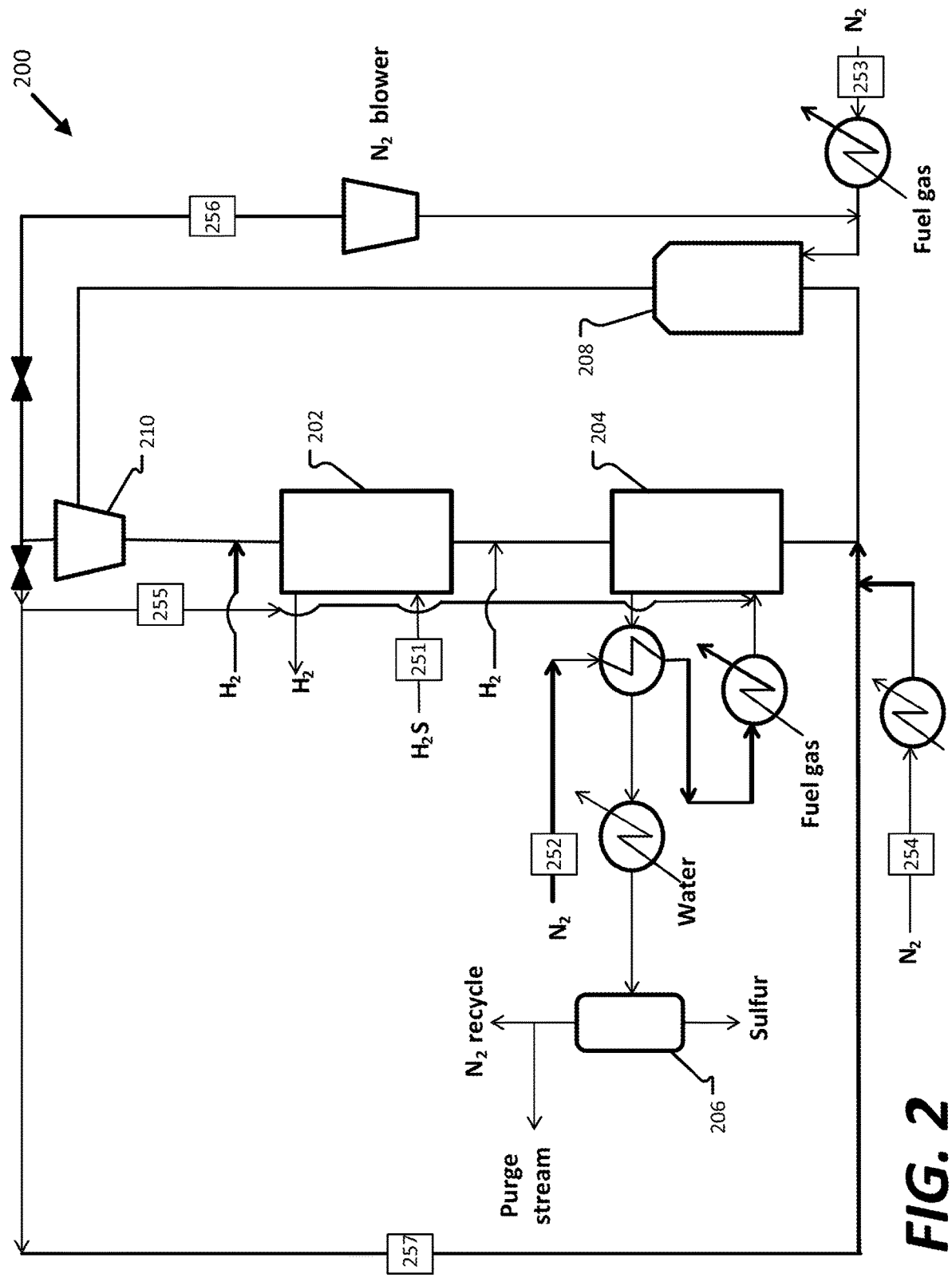
FIG. 2 shows a schematic diagram of another exemplary system for $H_2S$ conversion to $H_2$ and S.
Figure 3:
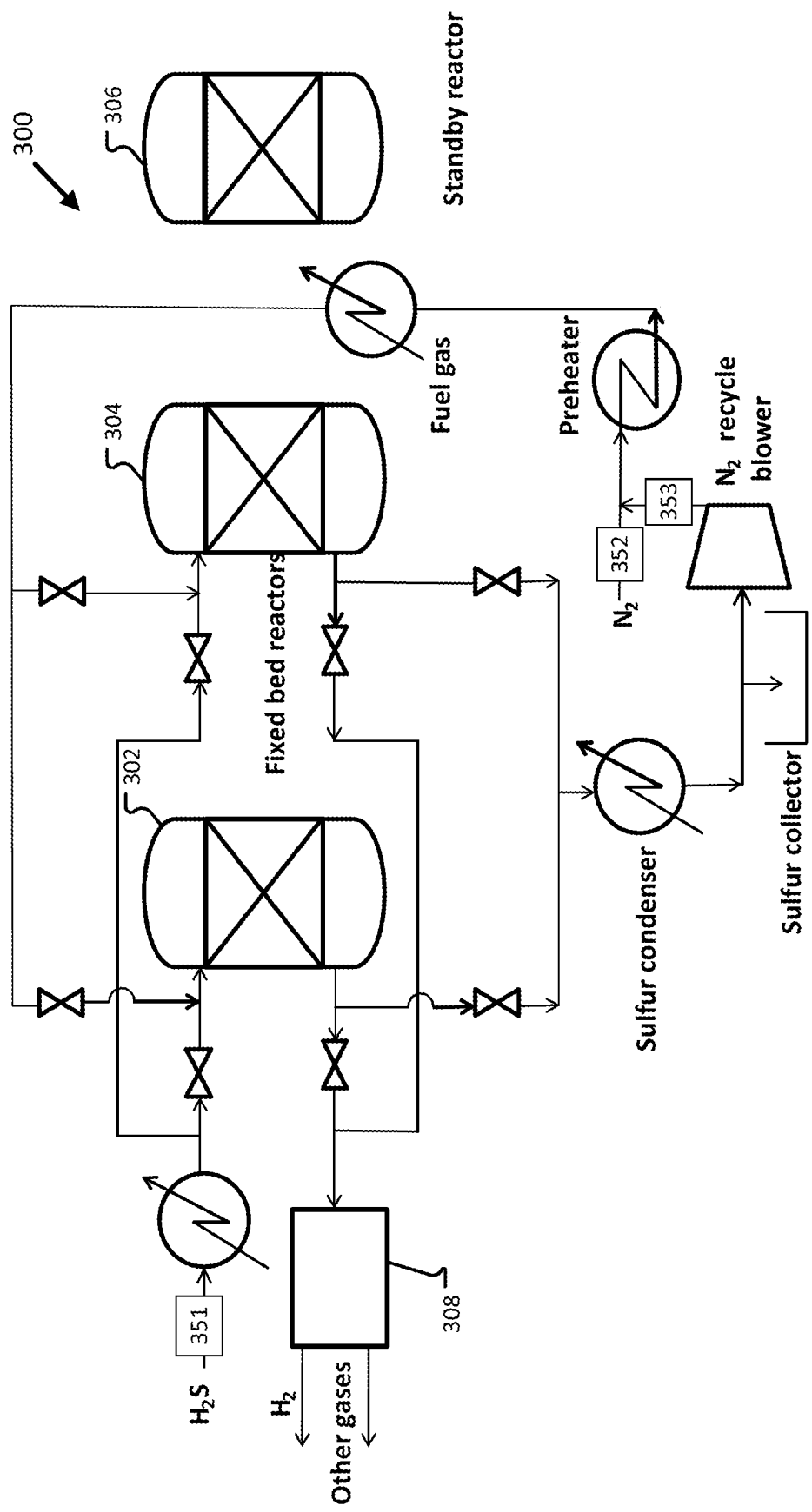
FIG. 3 shows a schematic diagram of another exemplary system for $H_2S$ conversion to $H_2$ and S.

FIG. 1, FIG. 2, and FIG. 3 are schematic diagrams of exemplary systems for conversion of $H_2S$. Various aspects regarding possible operating conditions for the exemplary systems, such as temperature, pressure, residence time, etc., as well as exemplary metal alloy composite particles usable in the exemplary systems, are described in greater detail above, apply to the following discussion, and are not repeated below for the purpose of conciseness.

FIG. 1 shows a schematic diagram of exemplary system 100 for $H_2S$ conversion to $H_2$ and S. As shown in FIG. 1, system 100 comprises sulfidation reactor 102 and regeneration reactor 104. The sulfidation reactor 102 includes a metal alloy composite particle as disclosed herein. An $H_2S$ containing gas stream is provided into the sulfidation reactor 102, resulting in the formation of hydrogen gas ($H_2$) and one or more sulfide minerals. The hydrogen gas ($H_2$) is collected, and the one or more sulfide minerals are provided to the regeneration reactor 104. An inert gas stream is provided into the regeneration reactor 104, resulting in the formation of sulfur gas and regeneration of the metal alloy composite particle. The metal alloy composite particle is provided back to the sulfidation reactor 102 and the sulfur gas is collected.

FIG. 2 shows a schematic diagram of exemplary system 200 for $H_2S$ conversion to $H_2$ and S. In system 200, alloy material reacts with $H_2S$ or $H_2S$ containing gas (stream number 251) in reactor 202. The alloy material with the captured sulfur is then transferred to reactor 204, where the alloy material is regenerated by an inert gas such as $N_2$. The $N_2$ sent to reactor 204 (stream number 252) is preheated with the gas outlet from reactor 204 and additional heating may be provided by burning fuel gas. The sulfur is removed in reactor 204, and the sulfur is then condensed by cooling with water and finally separated from $N_2$ in a gas-liquid separator 206. The regenerated solids are sent to reactor 208, where they are fluidized with heated $N_2$ (stream number 253) and then transported back to reactor 202. $N_2$ and solids separation occurs in the cyclone separator 210. The separated $N_2$ is recycled back to reactor 204 (stream number 255). The separated $N_2$ can also be sent to the reactor 208 for fluidization (stream number 256) or to an outlet of reactor 204 (stream number 257) for pushing the solids into reactor 208. $H_2$ is injected as a zone seal gas to prevent gas mixing between reactor 202, reactor 204 and cyclone separator 210. This is important to reduce downstream $H_2$ product gas purification.

Reactors 202 and 204 are operated as countercurrent moving bed reactors. The residence time of gas and solids in reactors 202 and 204 may be controlled such that there is complete $H_2S$ conversion in reactor 202 and complete regeneration in reactor 204. Reactor 208 is a fluidized bed reactor and its main purpose is for transporting solids via a riser back to reactor 202.

FIG. 3 shows a schematic diagram of exemplary system 300 for $H_2S$ conversion to $H_2$ and S. System 300 includes three fixed bed reactors. At a given time, sulfidation occurs in reactor 302, regeneration in reactor 304 and reactor 306 is on standby. $H_2S$ or $H_2S$ containing gas (stream number 351) is sent to reactor 302 and the outlet gas is sent to a pressure swing adsorption (PSA) unit 308 to produce high purity $H_2$. $N_2$ (stream number 352) is heated in two stages by preheater and then by fuel gas, before being sent to reactor 304 for removing sulfur from the solids. The sulfur removed is then condensed out in a sulfur condenser and the cooled down $N_2$ is recycled (stream number 353) back to the preheater. Once reactor 302 is saturated with sulfur, it is switched to regeneration with the use of remote operated valves. Reactor 306 is switched to sulfidation as it contains regenerated solids and reactor 304 is switched to standby. The number of reactors and switching time is contingent on the gas flow rates and amount of solids used in each of the reactors.

Figure 4:
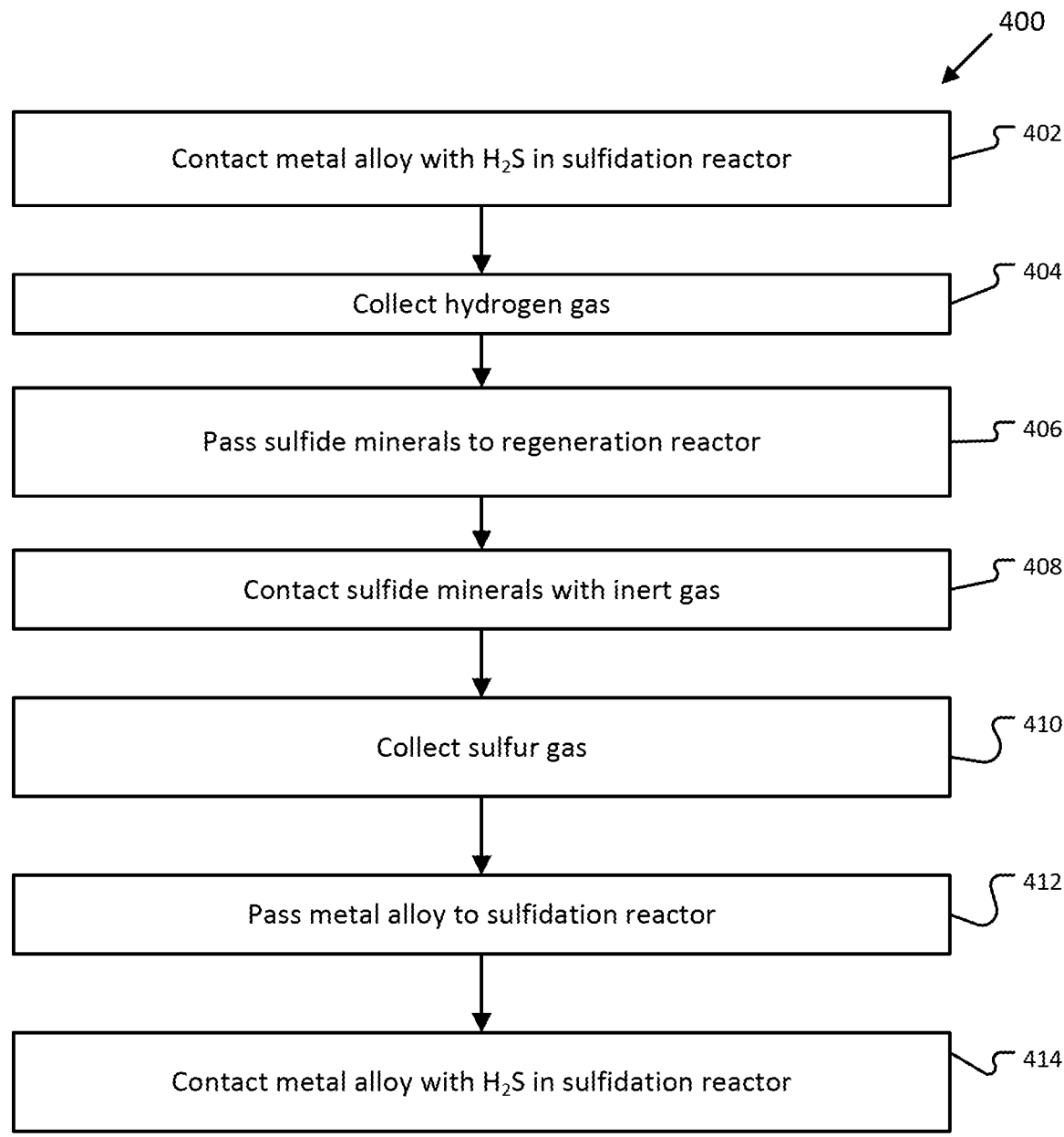
FIG. 4 shows an example method for $H_2S$ conversion to $H_2$ and S.

FIG. 4 shows an example method 400 for $H_2S$ conversion to $H_2$ and S. Method 400 begins by contacting the metal alloy composite particle (such as a metal alloy composite particle prepared by example method 500) with an $H_2S$ containing gas stream in a sulfidation reactor (operation 402). Operation 402 results in the formation of hydrogen gas ($H_2$) and one or more metal sulfides. Next, the hydrogen gas ($H_2$) is collected (operation 404). The remaining sulfide minerals are provided to the regeneration reactor (operation 406). The sulfide minerals are contacted with an inert gas in the regeneration reactor (operation 408). Operation 408 results in the formation of sulfur gas and regeneration of the metal alloy composite particle. The sulfur gas is collected (operation 410). The regenerated metal alloy composite particle is provided back to the sulfidation reactor (operation 412). The process then begins again by contacting the regenerated metal alloy composite particle with an $H_2S$ containing gas stream in the sulfidation reactor (operation 414). The process may be repeated for any desired number of cycles.

D. Example Improvements and Industrial Applications

The systems and methods disclosed herein result in conversion of a poisonous, toxic and corrosive gas like $H_2S$ to highly valuable chemicals like hydrogen ($H_2$) and sulfur ($S_2$). The methods can use a two-reactor system with few heat exchangers, or a one reactor system, to produce $H_2$ and sulfur from $H_2S$. Therefore, there are capital cost benefits in using fewer processing units compared to typically used methods. Moreover, the methods described herein are robust towards other gases, like carbon monoxide, hydrogen and hydrocarbons, commonly found in industrial process streams that contain $H_2S$. Therefore, the instant systems and methods typically do not require separating these gases before treating $H_2S$, which allows for savings in energy and capital costs that are usually involved with separating these gases.

The methods described herein allow $H_2S$ to be treated at very high temperatures. Treating at high temperatures reduces or eliminates the need for cooling and reheating the $H_2S$ containing gas stream as is typically done for conventional $H_2S$ removal processes such as Selexol, Rectisol, or amine based processes. Moreover, the disclosed methods and process utilize solids with high recyclability, resulting in the capacity for long term use and minimal replacement and waste management costs.

The methods described herein can be used in multiple industrial applications. For example, the methods described herein can be used for coal gasification to produce synthesis gas (syngas). The major components of synthesis gas are carbon monoxide (CO) and $H_2$ and this gas stream is at >500° C. This gas can be directly sent to the process disclosed herein without the need for cooling the gas stream or removing CO or $H_2$.

The methods described herein can be used in natural gas processing methods. $H_2S$ is typically removed from natural gas before it is sent to catalytic processes, such as steam methane reforming, to produce syngas and $H_2$. Steam methane reforming occurs in temperature range of 700-1000° C. and requires very low concentrations of $H_2S$ in the gas stream. The methods described herein can be used to reduce $H_2S$ concentrations in a gas stream to the desired values before use of the gas stream in catalytic processes such as steam methane reforming.

The methods described herein can be used in crude oil processing. Sulfur from crude oil is typically removed in a hydrodesulfurization unit by treating it with $H_2$ in a temperature range from 300-400° C. The gas from this unit is a mixture of $H_2S$ and $H_2$. The gas from such a hydrodesulfurization unit can be directly treated by a method described herein to produce $H_2$ and sulfur.

IV. Systems and Methods for Producing Metal Alloy Composite Particles

Further disclosed herein are systems and methods for producing metal alloy composite particles. The metal alloy composite particle may be produced by mixing the first metal component and the second metal component in their respective desired amounts. The mixture of the first metal component and the second metal component is reacted with $H_2S$ at a temperature of about 300° C. to about 900° C. For example, the mixture of the first metal component and the second metal component can be reacted with $H_2S$ at a temperature of about 300° C., about 350° C., about 400° C., about 450° C., about 500° C., about 550° C., about 600° C., about 650° C., about 700° C., about 750° C., about 800° C., about 850° C., or about 900° C. The time of the reaction is dependent on the amount of first metal component and the second metal component used. A mixture of thiospinel and higher metal sulfides is formed at the end of the reaction.

Nitrogen is then passed over the reacted mixture in a temperature range of about 600° C. to about 1200° C. For example, nitrogen may be passed over the reacted mixture at a temperature of about 600° C., about 650° C., about 700° C., about 750° C., about 800° C., about 850° C., about 900° C., about 950° C., about 1000° C., about 1050° C., about 1100° C., about 1150° C., or about 1200° C.

Subsequently, a secondary material can be mixed together with the alloy material. Additionally, a support material can be mixed together with the alloy material. The mixture is then sintered at a temperature of about 700° C. to about 1400° C. For example, the mixture may be sintered at a temperature of about 700° C., about 750° C., about 800° C., about 850° C., about 900° C., about 950° C., about 1000° C., about 1050° C., about 1100° C., about 1150° C., about 1200° C., about 1250° C., about 1300° C., about 1350° C., or about 1400° C.

Figure 5:
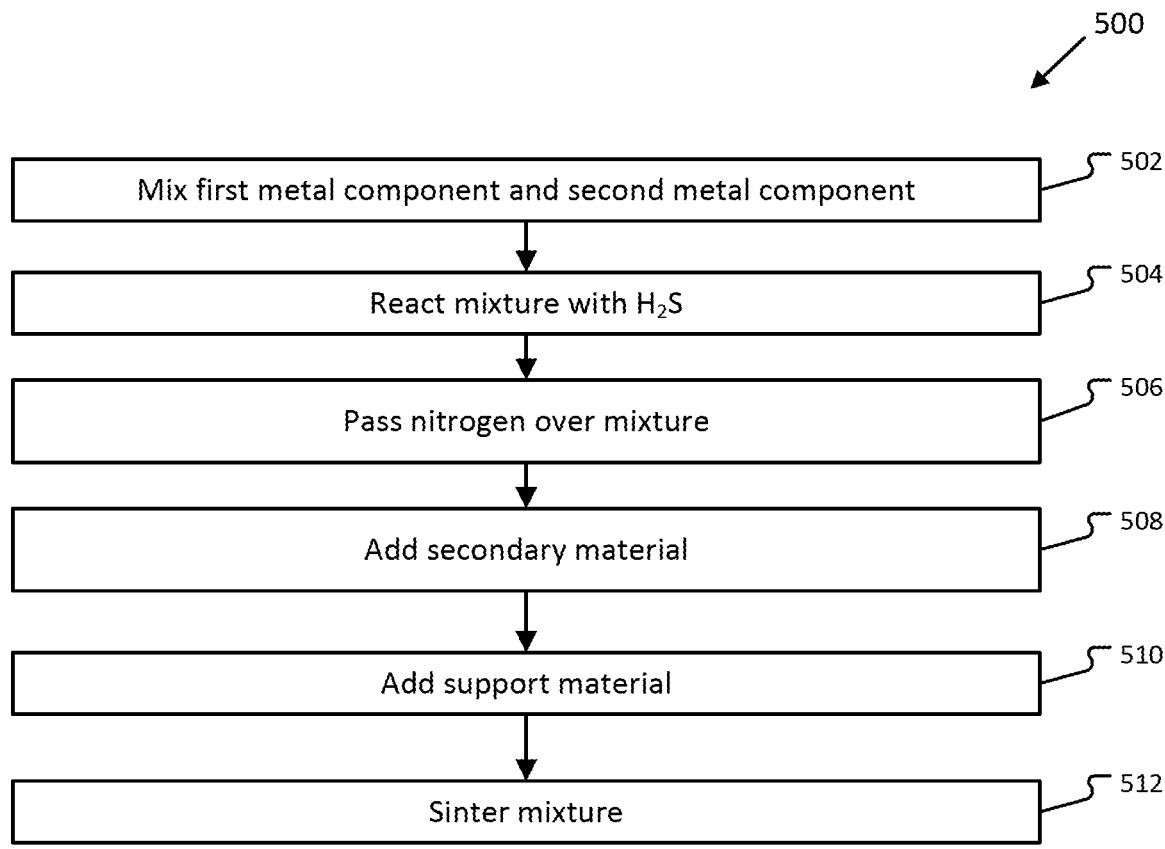
FIG. 5 shows an example method for preparing a metal alloy composite particle for use in $H_2S$ conversion to $H_2$ and S.

FIG. 5 shows an example method 500 for preparing a metal alloy composite particle for use in the disclosed method of $H_2S$ conversion to $H_2$ and S. Method 500 begins by mixing the first metal component and the second metal component (operation 502). The mixture of the first metal component and the second metal component is reacted with a gas containing $H_2S$ (operation 504). Next, nitrogen is passed over the mixture (operation 506). Next, a secondary material (operation 508) and a support material (510) are added to the mixture. Lastly, the mixture is sintered (operation 512).

V. Experimental Examples

Example 1

Iron-Chromium (Fe—Cr) Metal Alloy Preparation

Figure 6:
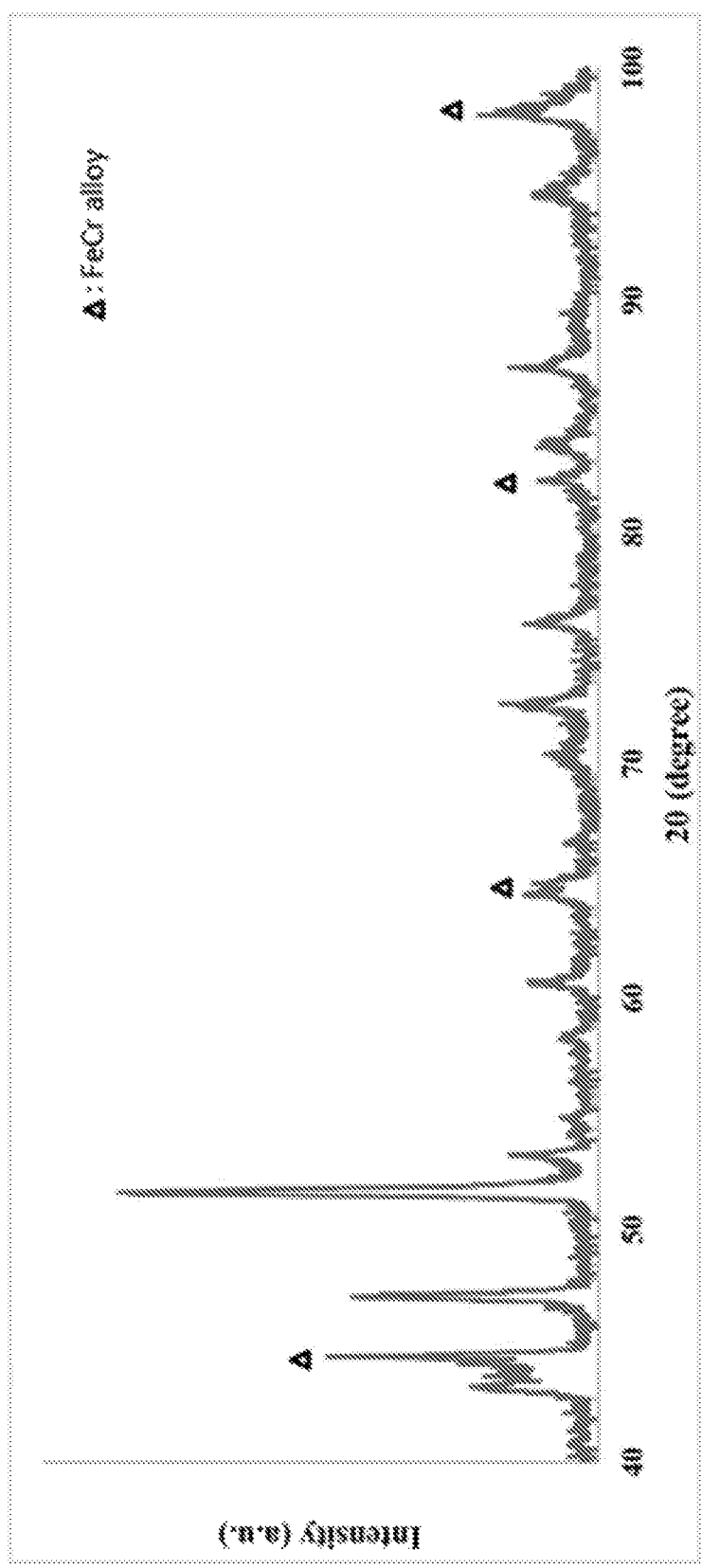
FIG. 6 shows the X-ray diffraction analysis of the iron-chromium metal alloy composite particle obtained after preparation in a fixed bed reactor.

Iron sulfide ($FeS_x$, $0<x<2$) and chromium sulfide ($CrS_y$, $0<y<1.5$) were mixed in a molar ratio of 1:2. Iron oxide, chromium oxide, iron metal, chromium metal or a mixture of these compounds can also be taken as the starting material. The said mixture was reacted with gas containing $H_2S$ at a concentration of 0.9% in a fixed bed reactor kept in a horizontal tube furnace. The said gas containing $H_2S$ was reacted at a temperature of 800° C. After reaction with $H_2S$, the gas was switched to $N_2$ and the temperature was increased to 950° C. FIG. 6 shows the X-ray diffraction (XRD) analysis of the solid sample obtained after cooling down to room temperature under the $N_2$. The presence of an Fe—Cr alloy is clearly visible from the XRD spectra.

Example 2

$H_2S$ Conversion by Exemplary Metal Alloy Composite Particles

Figure 7:
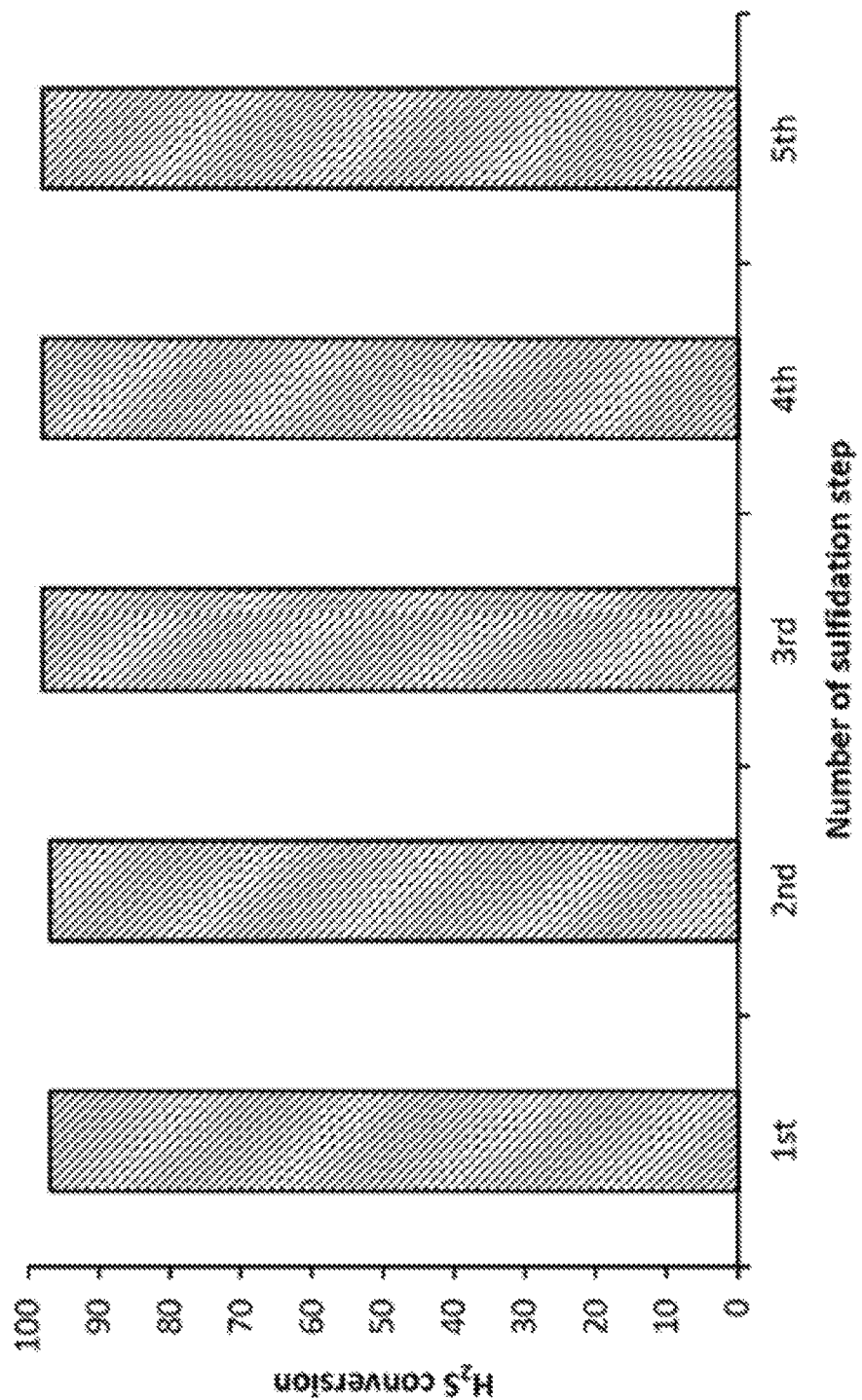
FIG. 7 shows $H_2S$ conversion for an iron-chromium alloy composite particle over five sulfidation-regeneration operations where the gas hourly space velocity for first two sulfidation operations was 5000 $hr^{-1}$ and for the last three was 2580 $hr^{-1}$.
Figure 8:
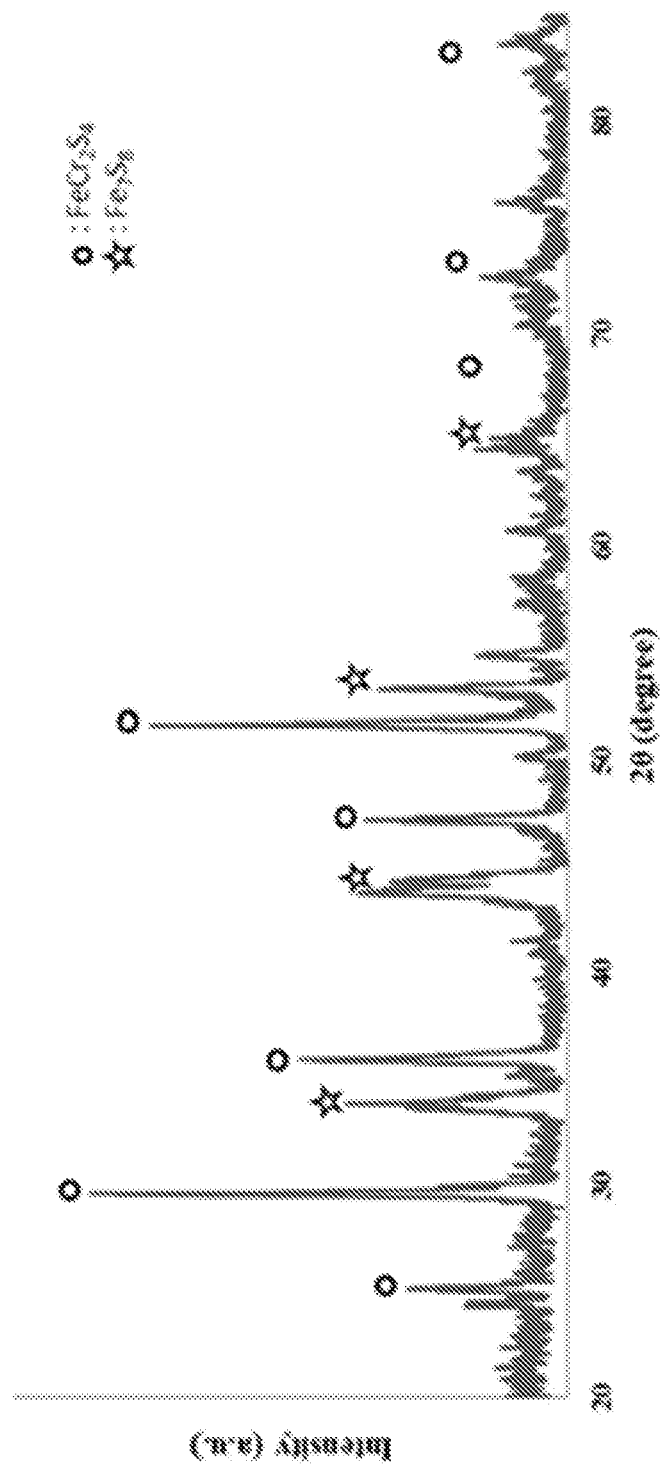
FIG. 8 shows X-ray diffraction analysis of solids in a fixed bed reactor after five sulfidation-regeneration operations.

FIG. 7 shows the performance of an Fe—Cr alloy in a fixed bed reactor for $H_2S$ conversion to $H_2$ and S over multiple sulfidation and regeneration operations. The temperatures of sulfidation and regeneration operations were 800° C. and 950° C., respectively. A 0.9% $H_2S/N_2$ gas was injected into the fixed bed reactor during sulfidation operation and $N_2$ was injected during the regeneration operation. The gas hourly space velocity (GHSV) for sulfidation operation for the first and second cycle was 5000 hr-1, whereas, GHSV for third, fourth and fifth sulfidation operation was 2580 hr-1. The concentration of gas leaving the fixed bed reactor was measured using a Siemens CALOMAT 6E $H_2$ analyzer. The gas was also intermittently sampled by Interscan's Model RM17-500m Toxic gas monitor to measure $H_2S$ concentration in the reactor outlet. $H_2S$ conversion was calculated based on the $H_2$ concentration detected by the $H_2$ analyzer. A high $H_2S$ conversion over multiple GHSVs repeated over several sulfidation-regeneration operations demonstrates excellent performance and recyclability of the Fe—Cr alloy. FIG. 8 shows the presence of iron-chromium thiospinel ($FeCr_2S_4$) via XRD analysis of the solids after the fifth sulfidation operation.

Table 1 shows the inlet and outlet composition of gas sent during sulfidation operation for two different runs at 800° C. in a fixed bed reactor containing Fe—Cr alloy. In run 1, 50 ml/min of 0.9% $H_2S/N_2$ and 46.95 ml/min 9.6% methane ($CH_4$)/19% $CO/81.4\%$ $N_2$ was co-injected into the fixed bed reactor for 30 min. The reactor outlet gas concentration was measured using a Siemens Ultramat 23 gas analyzer to measure CO, $CO_2$ and $CH_4$ concentrations and Siemens Calomat 6E gas analyzer to measure $H_2$ concentration. In run 2, 100 ml/min of 0.9% $H_2S/N_2$ and 100 ml/min of 100% $H_2$ was co-injected into the fixed bed reactor for 30 min. The reactor outlet gas concentration was measured using a Siemens CALOMAT 6E $H_2$ analyzer. The fact that the inlet and outlet gas compositions are the same indicates that $CH_4$, CO and $H_2$ do not react with the Fe—Cr alloy.

TABLE 1

Inlet and outlet gas composition for two experiments in a fixed bed reactor at 800° C., (*based on XRD analysis results and mass balance).

| | Run 1 | | Run 2 | |
| --- | --- | --- | --- | --- |
| Gases | Inlet gas composition (%) | Outlet gas composition (%) | Inlet gas composition (%) | Outlet gas composition (%)* |
| $H_2S$ | 0.46 | 0.009 | 0.45 | 0 |
| $CH_4$ | 9.28 | 9.28 | 0 | 0 |
| CO | 4.55 | 4.55 | 0 | 0 |
| $H_2$ | 0 | 0.451 | 50 | 50.45 |
| $N_2$ | 85.71 | 85.71 | 49.55 | 49.55 |

Figure 9:
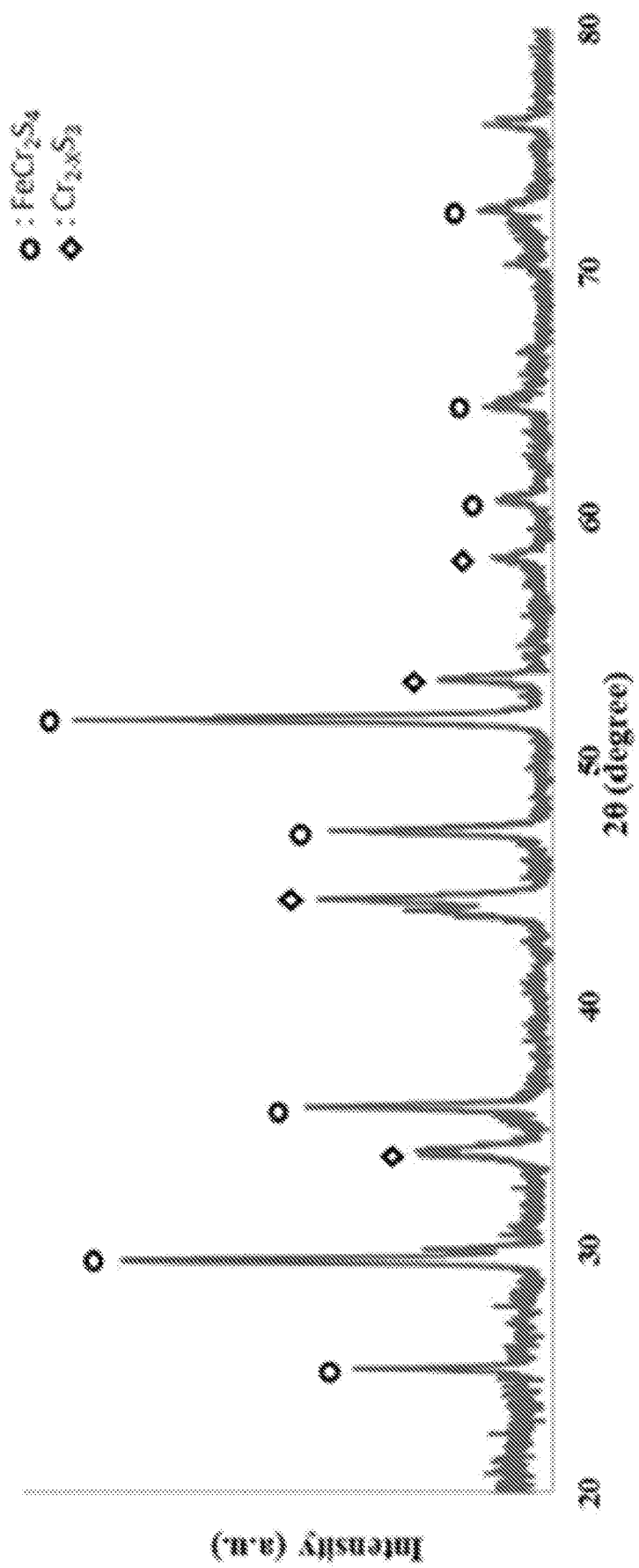
FIG. 9 shows the X-ray diffraction analysis of solids after run 1 in a fixed bed reactor.
Figure 10:
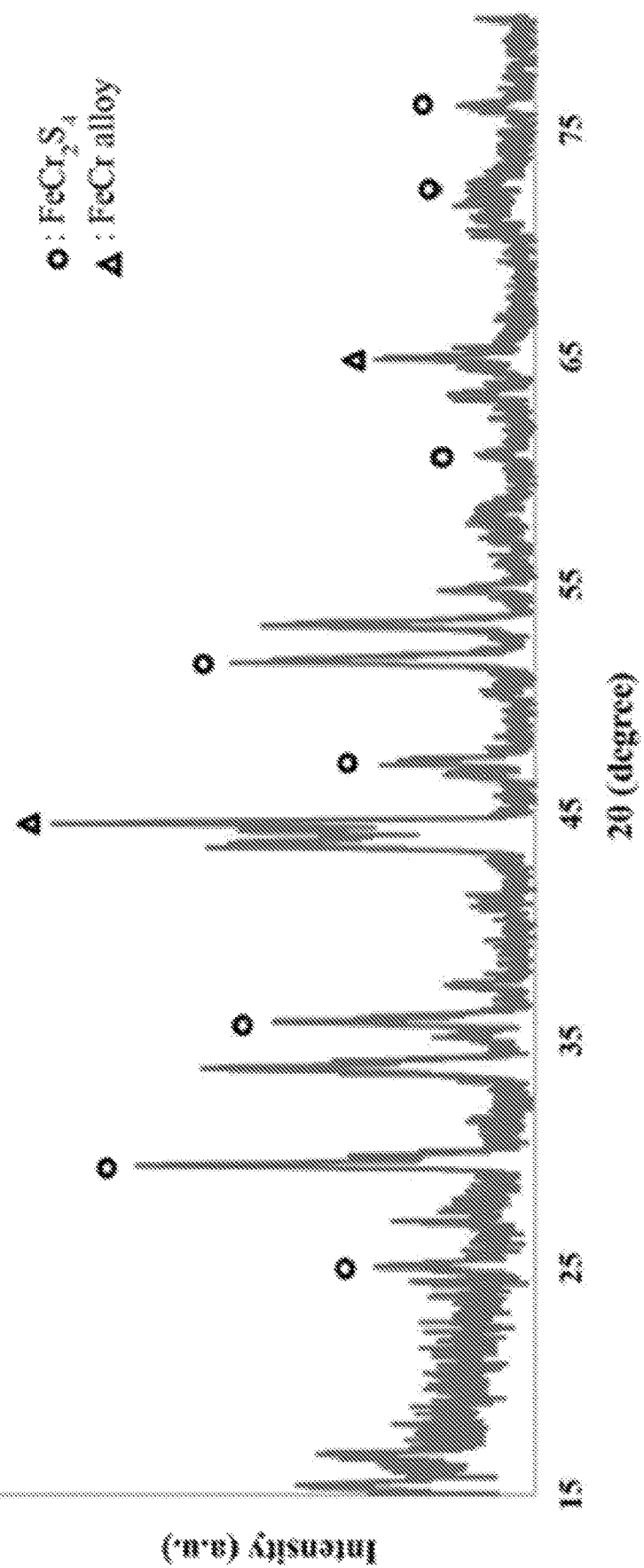
FIG. 10 shows the X-ray diffraction analysis of solids after run 2 in the fixed bed reactor used to obtain data shown in FIG. 9.

XRD analysis of the sample at the end of the Run 1 and Run 2 shown in FIG. 9 and FIG. 10, respectively, proved that sulfur in $H_2S$ was captured by the Fe—Cr alloy and $FeCr_2S_4$ was formed.

Figure 11:
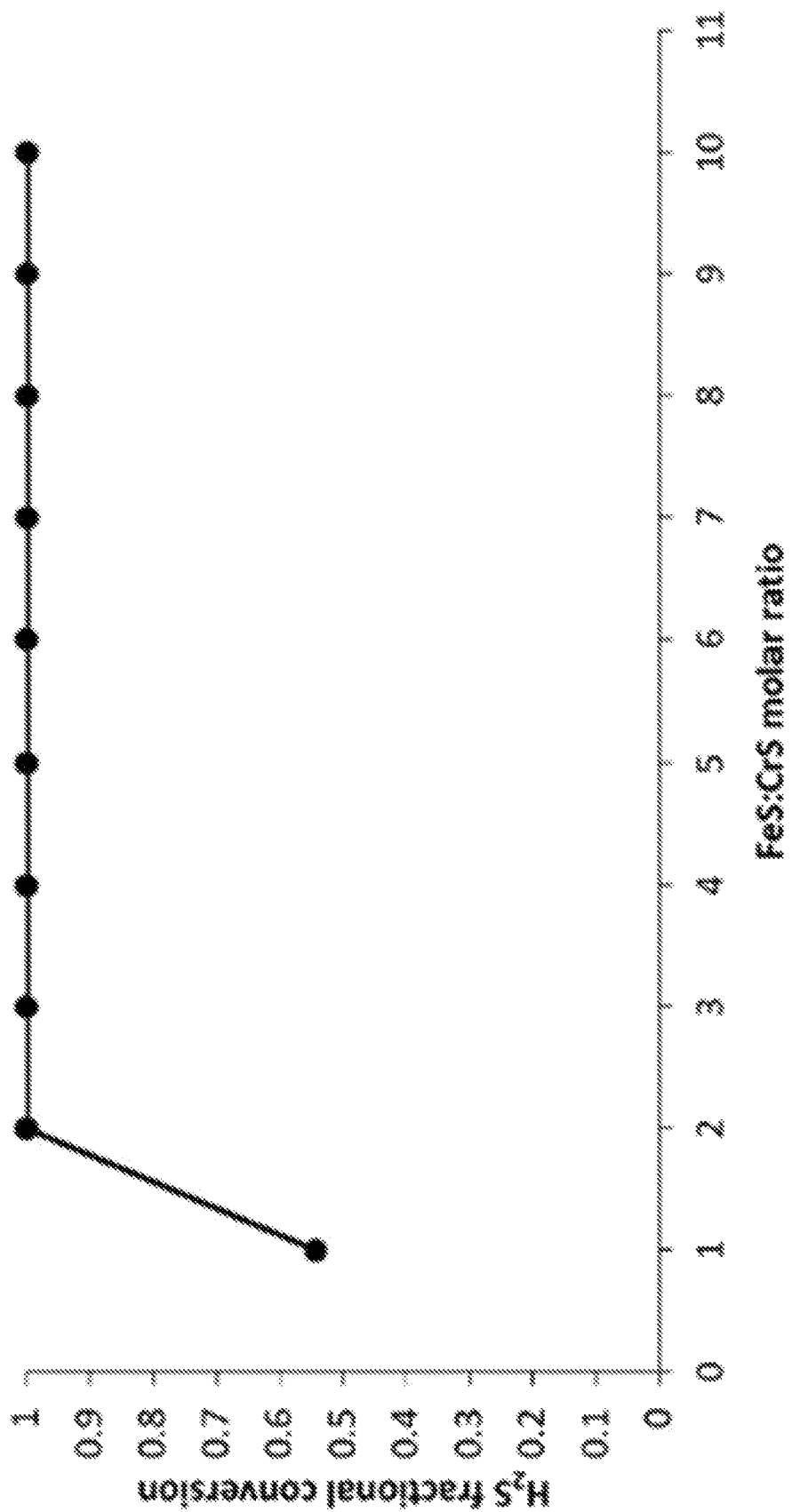
FIG. 11 shows calculated thermodynamic values of $H_2S$ fractional conversion as a function of iron monosulfide:chromium monosulfide molar ratio.
Figure 12:
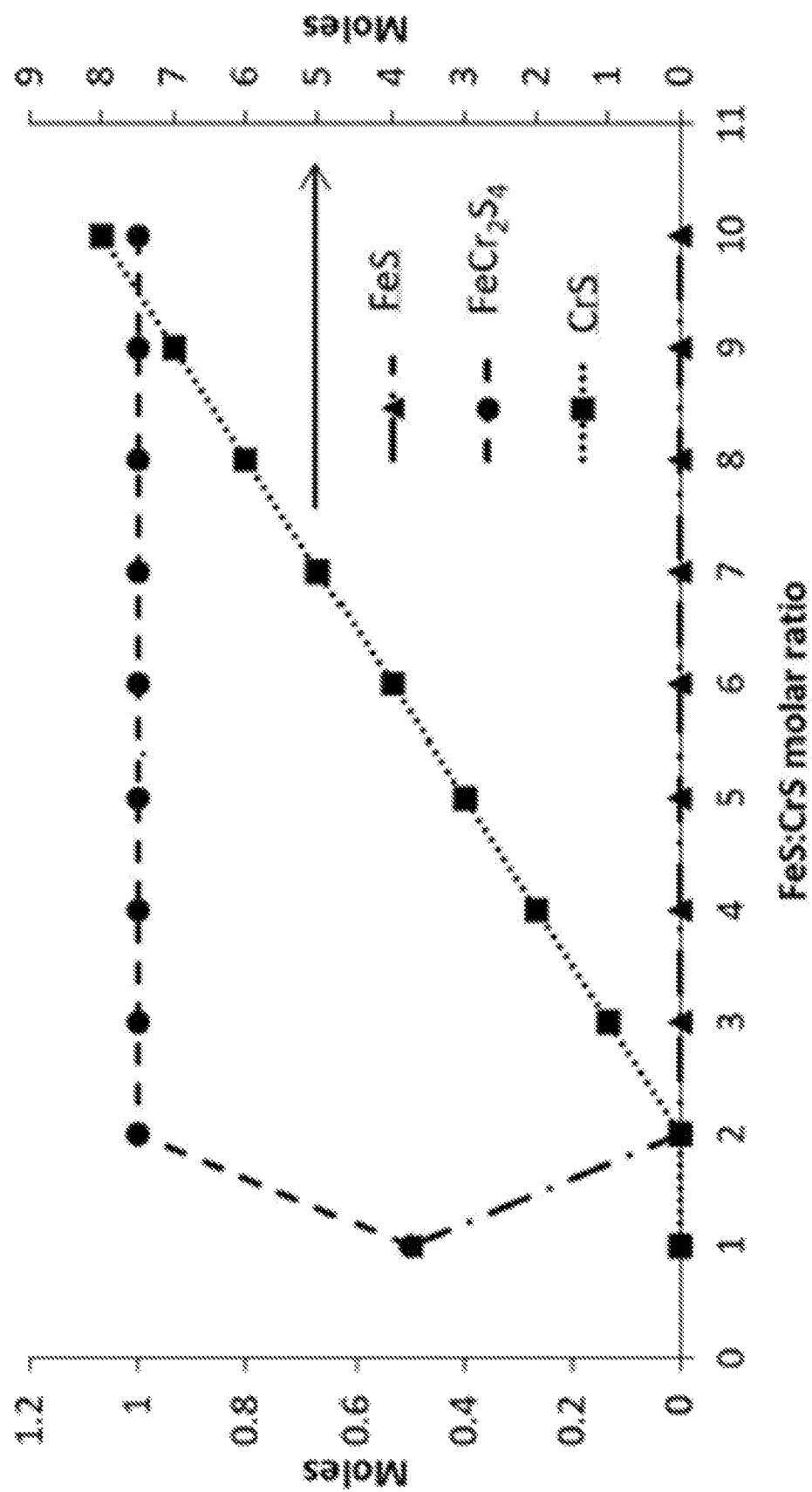
FIG. 12 shows calculated thermodynamic values for molar composition of iron monosulfide, chromium monosulfide and iron-chromium thiospinel as a function of iron monosulfide:chromium monosulfide molar ratio.

FIG. 11 and FIG. 12 illustrate the favorable effect that $FeCr_2S_4$ formation has on the thermodynamic equilibrium conversion of $H_2S$ to Hz. Equilib module in FactSage 7.1 software was used to perform the thermodynamic calculations. A basis of 1 mol of iron monosulfide (FeS) and 1 mol of $H_2S$ was selected whereas the moles of chromium monosulfide (CrS) were varied. In FIG. 12, $FeCr_2S_4$ is observed to form at FeS:CrS molar ratio of 2 and from that value of ratio onwards the corresponding $H_2S$ fractional conversion to $H_2$ is 1 as seen in FIG. 11.

Example 3

Figure 13:
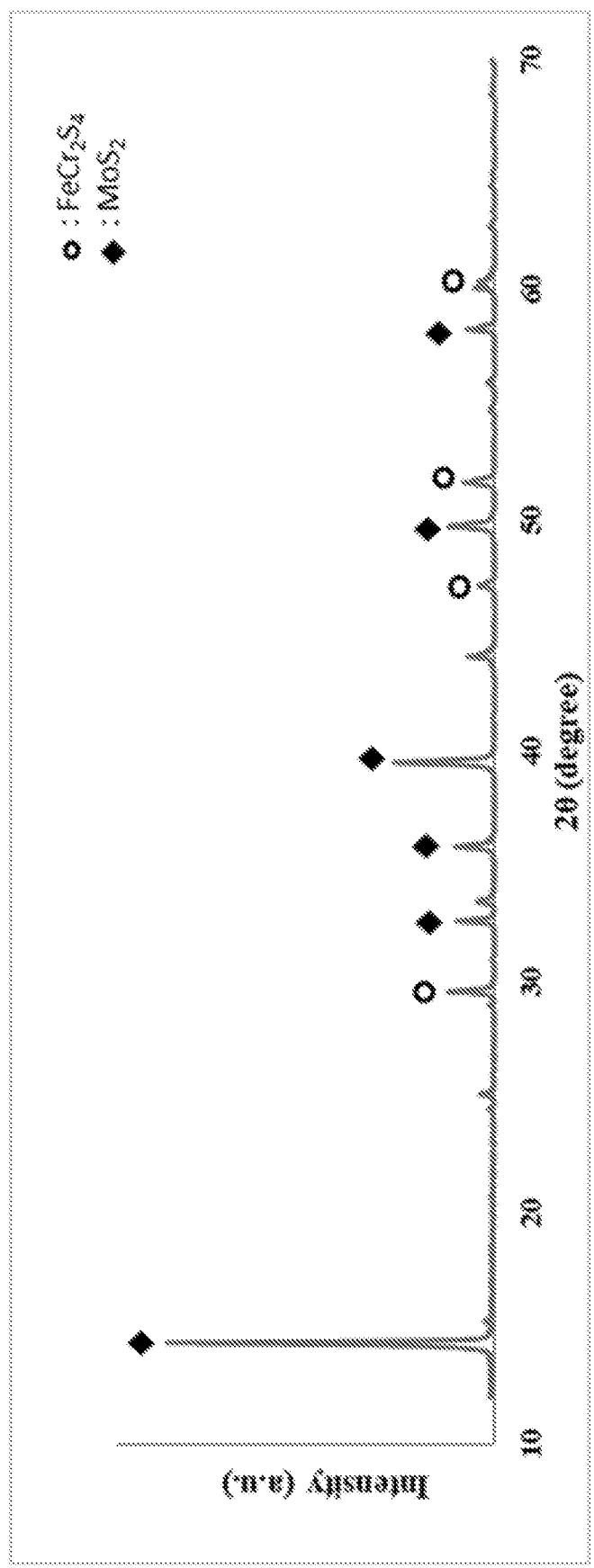
FIG. 13 shows the X-ray diffraction analysis of Fe—Cr alloy with $MoS_2$ secondary material after reaction with 0.9% $H_2S$ at 800° C.

Fe—Cr Bimetallic Alloy Comparison with Fe—Cr Bimetallic Alloy and $MoS_2$ Secondary Material Table 2 shows the comparison of $H_2S$ conversion by Fe—Cr alloy material (sample 1) against that of Fe—Cr alloy material added with $MoS_2$ secondary material (sample 2). The primary phases present in the Fe—Cr alloy based on XRD analysis are $FeCr_2S_4$ (31.3 wt %), FeCr or 410 L stainless steel (63.4 wt %) and $Cr_2O_3$ (5.2 wt %). The composition of sample 2 is 50 wt % of the Fe—Cr alloy (sample 1) and 50 wt % $MoS_2$. For both samples, powder of size less than 125 microns was placed in between quartz wool and supported in the heated region of a 0.5 inch inner diameter ceramic reactor. The samples were heated to a temperature of 800° C. under nitrogen followed by reaction with 0.9% $H_2S$ in the sulfidation step, where the gas flow rate was varied to test different gas hourly space velocities (GHSVs). The sulfidation step was followed by a regeneration step under nitrogen flow at 950° C. Multiple sulfidation and regeneration steps were conducted for both the samples where different GHSVs were tested during the sulfidation step. The reactor outlet gas composition was measured using a Siemens CALOMAT 6E $H_2$ analyzer for $H_2$ concentration and intermittently using Interscan's Model RM17-500m Toxic gas monitor for $H_2S$ concentration. A high $H_2S$ conversion for sample 2 indicates faster reaction kinetics of the solid sample with $H_2S$, which may be a result of addition of $MoS_2$ as the secondary material. The XRD analysis of Sample 2 after reaction is shown in FIG. 13, where $FeCr_2S_4$ and $MoS_2$ phases have been marked.

TABLE 2

$H_2S$ conversion comparison between sample 1 and sample 2 at 800° C. with 0.9% $H_2S$

| | $H_2S$ conversion (%) | |
|---|---|---|
| GHSV ($hr^{-1}$) | Sample 1 | Sample 2 |
| 12000 | 83.33 | 100 |
| 15000 | 73.24 | 88.55 |
| 18000 | 61.04 | 78.84 |

Example 4

Figure 14:
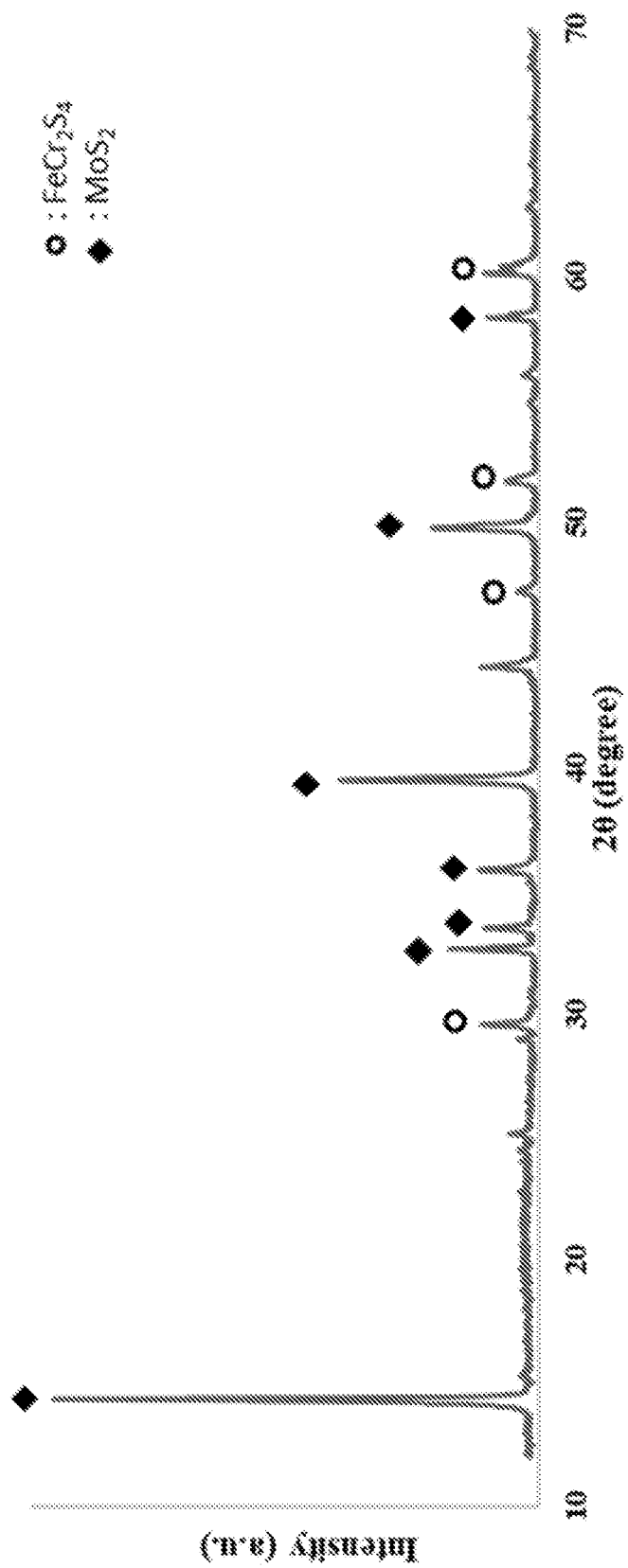
FIG. 14 shows the X-ray diffraction analysis of Fe—Cr alloy with $MoS_2$ secondary material and $SiO_2$ support material after reaction with 0.9% $H_2S$ at 800° C.

Fe—Cr Bimetallic Alloy Comparison with Fe—Cr Bimetallic Alloy with $MoS_2$ Secondary Material and $SiO_2$ Support Material Table 3 compares the $H_2S$ conversion of Fe—Cr alloy (sample 3) with that of Fe—Cr alloy with added $MoS_2$ secondary material and $SiO_2$ as the support material (sample 4). Based on XRD analysis, sample 3 has $FeCr_2S_4$ (37.3 wt %), FeCr or 410 L stainless steel (25 wt %) and $Fe_{0.879}S$ (37 wt %) as the major phases. The composition of sample 4 is 37.5 wt % Fe—Cr alloy (sample 3), 25 wt % $MoS_2$ and 37.5 wt % $SiO_2$. Multiple sulfidation-regeneration steps were conducted on both the samples in a 0.5 inch inner diameter ceramic reactor. The sulfidation temperature was 800° C. and regeneration temperature was 950° C. $H_2S$ conversion was measured during one of the sulfidation steps at the same $H_2S$ flow rate per unit active material weight for both the samples. The active material consists of both the Fe—Cr alloy as well as the secondary material-$MoS_2$. The reactor outlet gas composition was measured using a Siemens CALOMAT 6E $H_2$ analyzer for $H_2$ concentration and intermittently using Interscan's Model RM17-500m Toxic gas monitor for $H_2S$ concentration. The $H_2S$ conversion of sample 4 is slightly higher than sample 3 which may be a result of faster reaction kinetics with $H_2S$. The $H_2S$ conversion for sample 4 may be further enhanced by varying its alloy, secondary material and/or support material composition. FIG. 14 shows the $FeCr_2S_4$ and $MoS_2$ phases present in sample 4 based on XRD analysis.

TABLE 3

$H_2S$ conversion comparison between sample 3 and sample 4 at 800° C. with 0.9% $H_2S$

| 0.9% $H_2S$ flow rate/weight of | $H_2S$ conversion (%) | |
|---|---|---|
| active material (ml/min · g) | Sample 3 | Sample 4 |
| 128 | 83.33 | 86.11 |

Example 5

Fe—Cr Bimetallic Alloy with $MoS_2$ Secondary Material with Different Gas Mixtures Fe—Cr alloy with 20 wt % $MoS_2$ was tested with four different gas mixtures, shown in Table 4 below, and at a pressure of 1.8 bar.

TABLE 4

Reaction performance of Fe—Cr alloy with 20 wt % $MoS_2$ with different gas mixtures [*HCs = (1.04 vol %) 1,3-butadiene, (2.02 vol %) 2-butene, (6.04 vol %) hydrogen, (7.25 vol %) methane, (2.07 vol %) n-pentane, (2 vol %) propylene, (79.58 vol %) ethylene].

| Mixture No. | Inlet gas composition (%) | | | | | | | Gas hourly space velocity GHSV ($hr^{-1}$) | Reaction performance |
|---|---|---|---|---|---|---|---|---|---|
| | $CH_4$ | CO | $H_2$ | $CO_2$ | $H_2S$ | $N_2$ | HCs* | | |
| 1 | 7.08 | 3.52 | — | — | 0.56 | 88.84 | — | 8800 | 95-100% $H_2S$ conversion for 45 min No oxides in solids |

TABLE 4-continued

Reaction performance of Fe—Cr alloy with 20 wt % MoS$_2$ with different gas mixtures
[*HCs = (1.04 vol %) 1,3-butadiene, (2.02 vol %) 2-butene, (6.04 vol %) hydrogen, (7.25 vol %) methane, (2.07 vol %) n-pentane, (2 vol %) propylene, (79.58 vol %) ethylene].

| Mixture No. | Inlet gas composition (%) | | | | | | | Gas hourly space velocity GHSV (hr$^{-1}$) | Reaction performance |
|---|---|---|---|---|---|---|---|---|---|
| | CH$_4$ | CO | H$_2$ | CO$_2$ | H$_2$S | N$_2$ | HCs* | | |
| 2 | — | — | 75 | — | 0.25 | 24.75 | — | 24000 | 95-100% H$_2$S conversion for 15 min |
| 3 | — | — | — | 25 | 0.67 | 74.33 | — | 10000 | 95-100% H$_2$S conversion for 36 min No oxides in solids |
| 4 | — | — | — | — | 0.4 | 43.89 | 55.71 | 12000 | 95-100% H$_2$S conversion for 23 min No carbon deposition |

The Fe—Cr alloy was used in powder form with particle size <125 microns in a ceramic fixed bed reactor of 0.5 inch inner diameter. The reactor was heated using an electrical heater to a temperature of 400° C. under the flow of N$_2$. Once the reactor temperature reached 400° C., mixing of the various gas compositions mentioned in Table 4 was started.

Gas hourly space velocity (GHSV) shown in the second to last column in Table 4 was calculated based on the gas flow rate and metal alloy composite bed volume. H$_2$S conversion was measured based on measuring sulfur content in the alloy before and after the reaction. Sulfur content was measured using a Thermo Fisher Scientific TS 3000 total sulfur analyzer (Waltham, Mass.). The H$_2$S conversion for the different gas mixtures is shown in the last column of Table 4.

For gas mixtures 1 and 3, no oxides were observed in the solids from XRD analysis. Moreover, no carbon deposition was observed for gas mixture 4 based on XRD analysis of the reacted sample. Therefore, the alloy appears to be resistant to oxidation with CO$_2$ and CO along with being resistant to carbon deposition in presence of hydrocarbons at 400° C. This resistance allows for application of the alloy for H$_2$S capture from a variety of process streams that can contain any of the contaminants mentioned in Table 4.

Example 6

Recyclability of Fe—Cr Alloy Sample

Figure 15:
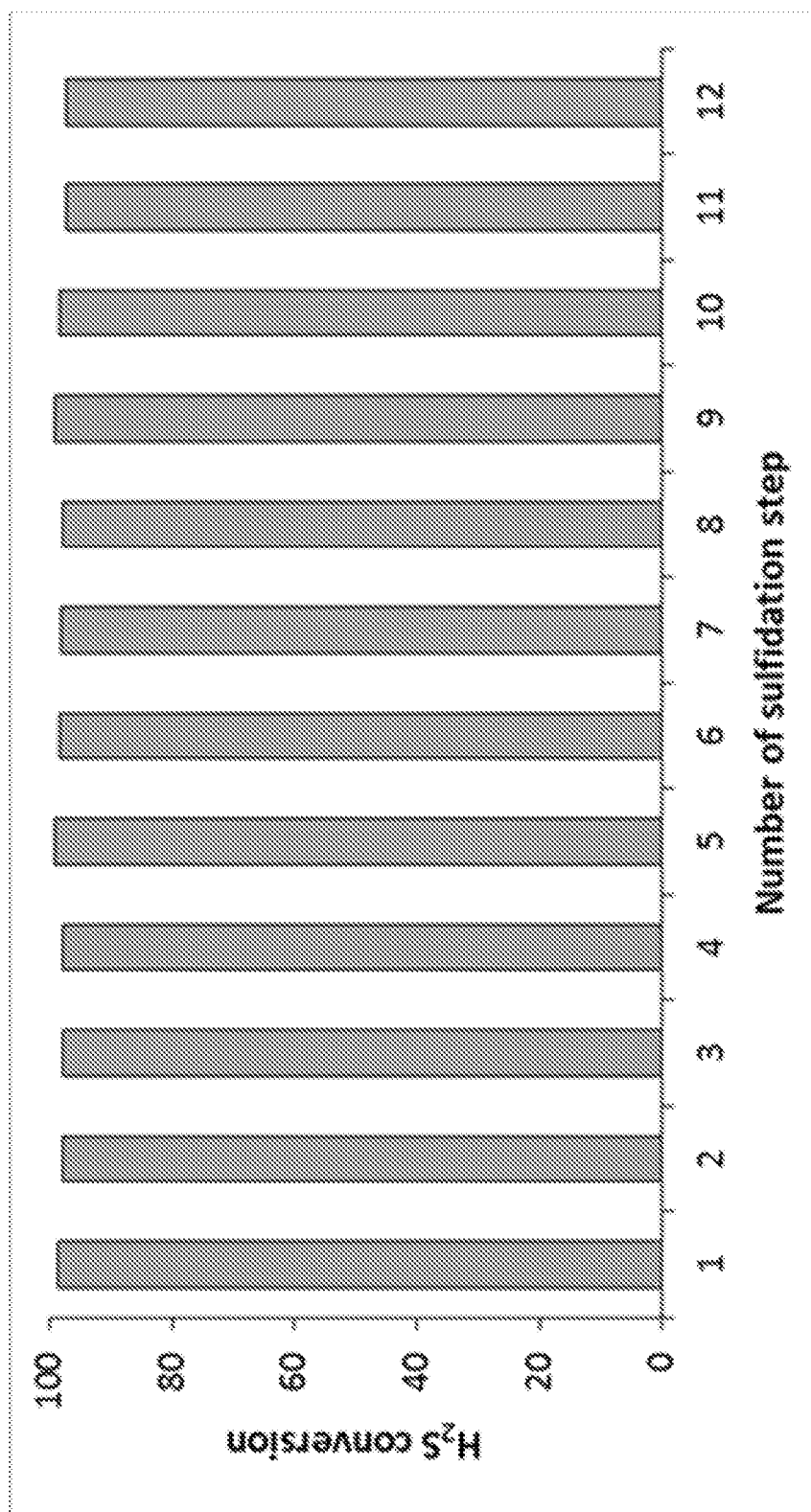
FIG. 15 shows $H_2S$ conversion over 12 consecutive sulfidation-regeneration cycles with Fe—Cr alloy containing 20 wt % $MoS_2$.

Recyclability of exemplary Fe—Cr alloy particles was tested by performing twelve consecutive sulfidation-regeneration cycles over Fe—Cr alloy with 20 wt % MoS$_2$ in a fixed bed reactor. The fixed bed reactor was made of ceramic material and had an inner diameter of 0.5 inch. The sulfidation temperature was 400° C. and the regeneration temperature was 950° C. The gas feed during sulfidation step was 0.9% H$_2$S balanced with N$_2$ at a GHSV of 1490 hr$^{-1}$. The reactor pressure was 1 bar for all the sulfidation steps except for the 8$^{th}$ step where the reactor pressure was increased to 1.8 bar. H$_2$S conversion was calculated based on the H$_2$ concentration measured using a Siemens CALOMAT 6E H$_2$ analyzer. Nearly 100% conversion (FIG. 15) was observed over the 12 cycles, which indicated excellent recyclability of the Fe—Cr alloy.

Example 7

Effect of Pressure on H$_2$S Conversion with Fe—Cr Alloy

Figure 16:
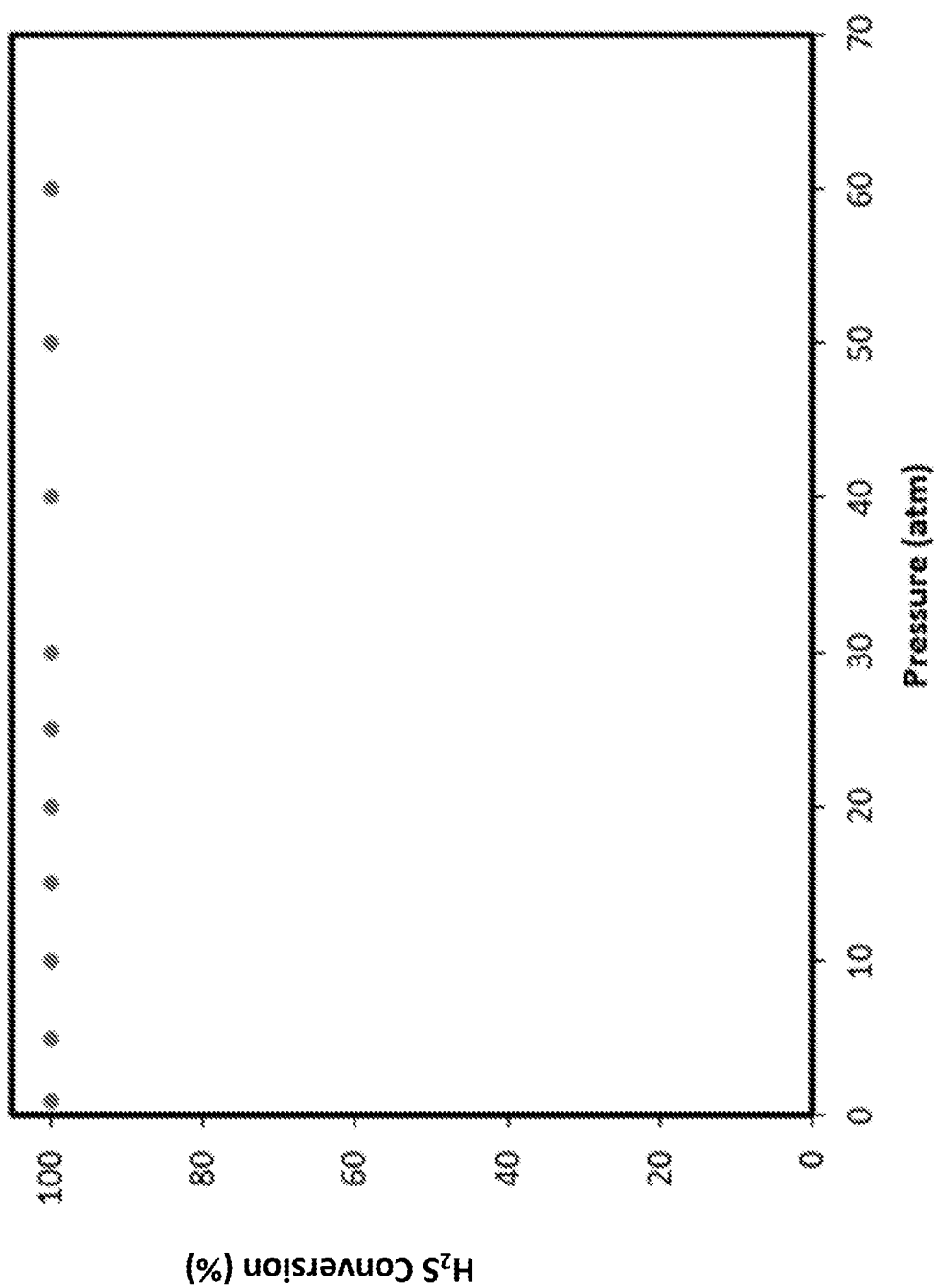
FIG. 16 shows $H_2S$ conversion as a function of pressure at 400° C. as obtained by using FactSage 7.3 software.

Effects of pressure on H$_2$S conversion with a Fe—Cr alloy were tested. Thermodynamic calculations conducted in FactSage 7.3 software demonstrate no effect of pressure on the conversion of H$_2$S. The H$_2$S input was 1 mole, whereas, FeS and CrS input was 1 mole and 2 moles, respectively. FIG. 16 shows that at 400° C., H$_2$S conversion is nearly 100% for all the pressures between 1 to 60 atm.

Experimentally, pressure was observed to improve the kinetics of H$_2$S conversion. Fe—Cr alloy powder of particle size <125 microns was reacted with 0.9% H$_2$S in a 0.5 inch inner diameter ceramic reactor. H$_2$S conversion was calculated based on the H$_2$ concentration measured using a Siemens CALOMAT 6E H$_2$ analyzer and intermittently with Interscan's Model RM17-500m Toxic gas monitor for H$_2$S concentration. At 400° C. reactor temperature, the H$_2$S conversion was 32% higher at 1.8 atm compared to 1 atm for a GHSV of 4500 hr$^{-1}$.

Example 8

Performance of Fe—Cr Alloy Material with Ni

Fe—Cr alloy material with Ni was tested in a fixed bed reactor for H$_2$S conversion. The sample consisted of 45 wt % Fe—Cr alloy, 10 wt % Ni$_3$S$_2$ and 45 wt % SiO$_2$. The Fe—Cr alloy material was used in a powder form in a 0.5 inch inner diameter ceramic reactor, which was heated by an electrical heater to a temperature of 800° C. H$_2$S conversion was calculated by measuring the H$_2$S concentration in the reactor outlet using Interscan's Model RM17-500m Toxic gas monitor. 0.9% H$_2$S balanced with N$_2$ was reacted with Sample 1 at a GHSV of 3800 hr$^{-1}$. The maximum H$_2$S conversion was >90%.

We claim:

1. A method comprising:
    contacting a first gaseous input stream comprising hydrogen sulfide ($H_2S$) with a metal alloy particle at a temperature between 300° C. and 450° C., the metal alloy particle comprising at least a first metal component comprising a first metal, and a second metal component comprising a second metal that is different from the first metal,
        whereupon the hydrogen sulfide ($H_2S$) in the first gaseous input stream reacts in a sulfidation reaction with the metal alloy particle to generate hydrogen gas ($H_2$) and one or more sulfide minerals,
    collecting a first gaseous product stream comprising the hydrogen gas ($H_2$);
    after collecting the first gaseous product stream, contacting a second gaseous input stream comprising at least one inert gas with the one or more sulfide minerals, thereby generating sulfur gas and regenerating the metal alloy particle; and
    collecting a second gaseous product stream comprising the sulfur gas.

2. The method according to claim 1, wherein the first gaseous input stream further comprises one or more of CO, $H_2$, $CO_2$, and a hydrocarbon feedstock.

3. The method of claim 1, wherein the first metal component comprises the first metal, a first metal sulfide comprising the first metal, a first metal oxide comprising the first metal, or combinations thereof, and wherein the second metal component comprises the second metal, a second metal sulfide comprising the second metal, a second metal oxide comprising the second metal, or combinations thereof.

4. The method of claim 1, wherein each of the first metal and second metal is selected from the group consisting of iron (Fe), chromium (Cr), nickel (Ni), Zinc (Zn), cobalt (Co), manganese (Mn) and copper (Cu).

5. The method of claim 1, wherein the sulfide mineral is selected from the group consisting of a metal sulfide, a thiospinel and combinations thereof.

6. The method of claim 5, wherein the sulfide mineral is selected from the group consisting of an iron sulfide, a chromium sulfide, and combinations thereof.

7. The method of claim 6, wherein the sulfide mineral comprises $FeCr_2S_4$.

8. The method of claim 1, wherein the first metal is iron (Fe) and the second metal is chromium (Cr).

9. The method of claim 1, wherein the at least one inert gas is selected from the group consisting of nitrogen, carbon dioxide, air and combinations thereof.

10. The method of claim 1, wherein the metal alloy particle is a particle having a diameter of between about 100 microns and about 10 mm.

11. The method of claim 1, wherein the step of contacting the first gaseous input stream with the metal alloy particle is carried out in a sulfidation reactor selected from the group consisting of a fixed bed reactor, a fluidized bed reactor, a co-current moving bed reactor and a counter-current moving bed reactor.

12. The method of claim 11, wherein the molar ratio of gases:solids within the sulfidation reactor during the step of contacting the first gaseous input stream with the metal alloy particle is between about 0.2 to about 10.

13. The method of claim 1, wherein the step of contacting the first gaseous input stream with the metal alloy particle is carried out at a first pressure between about 1 atm and about 150 atm.

14. The method of claim 1, wherein the step of contacting the second gaseous input stream with the one or more sulfide minerals is carried out in a regeneration reactor selected from the group consisting of a fixed bed reactor, a fluidized bed reactor, a co-current moving bed reactor and a counter-current moving bed reactor.

15. The method of claim 14, wherein the molar ratio of gases:solids within the regeneration reactor during the step of contacting the second gaseous input stream with the one or more sulfide minerals is between about 0.2 to about 10.

16. The method of claim 1, wherein the step of contacting the second gaseous input stream with the one or more sulfide minerals is carried out at a second temperature between about 500° C. and about 1100° C., and a second pressure between about vacuum conditions and about 150 atm.

17. The method of claim 1, wherein the first gaseous product stream comprises less than 100 ppmv $H_2S$.

18. The method of claim 1, further comprising after collecting the second gaseous product stream, contacting the regenerated metal alloy with a subsequent first gaseous input stream such that a hydrogen gas ($H_2$) production performance of the regenerated metal alloy particle is similar to a hydrogen gas ($H_2$) production performance of the metal alloy particle.

19. The method of claim 1, wherein contacting the first gaseous input stream and contacting the second gaseous input stream is performed in a batch operational mode, in a semibatch operational mode, or in a continuous operational mode.

20. The method of claim 1, wherein the first gaseous input stream does not include oxygen ($O_2$).

21. A metal alloy particle for use in a method of converting $H_2S$ to hydrogen ($H_2$) and sulfur, the metal alloy particle comprising a first metal component, a second metal component, and at least one secondary material,
    wherein the first metal component comprises iron, the second metal component comprises chromium, and the at least one secondary material is molybdenum, nickel, cobalt, manganese, tungsten, vanadium or a combination thereof.

22. The metal alloy particle of claim 21, wherein the metal alloy particle further comprises one or more support materials.

23. The metal alloy particle of claim 21, wherein the first metal component comprises an iron sulfide and the second metal component comprises a chromium sulfide.

24. The metal alloy particle of claim 21, wherein the at least one secondary material is a molybdenum sulfide, a nickel sulfide, a cobalt sulfide, a manganese sulfide, a tungsten sulfide, vanadium sulfide or a combination thereof.

25. The metal alloy particle of claim 21, wherein the metal alloy particle comprises 10-95% by weight of the first metal component, 5-80% of the second metal component, and 1-50% by weight of the at least one secondary material.

26. The metal alloy particle of claim 21, wherein the metal alloy comprises a support material selected from $Al_2O_3$, $SiO_2$, $TiO_2$, and $ZrO_2$.

27. A method of producing the metal alloy particle of claim 21, the method comprising mixing the first metal component with the second metal component to produce a mixture, contacting the mixture with a gas stream comprising $H_2S$ to produce a reacted mixture, passing nitrogen over the reacted mixture to form a bimetallic alloy, and mixing one or more secondary materials and optionally one or more support materials with the bimetallic alloy to produce the metal alloy.

* * * * *